United States Patent [19]

Davis et al.

[11] Patent Number: 4,991,133
[45] Date of Patent: Feb. 5, 1991

[54] SPECIALIZED COMMUNICATIONS PROCESSOR FOR LAYERED PROTOCOLS

[75] Inventors: Gordon T. Davis; Robert E. Landa; Baiju D. Mandalia; Jan W. van den Berg; David C. Van Voorhis, all of Boca Raton, Fla.

[73] Assignee: International Business Machines Corp., Armonk, N.Y.

[21] Appl. No.: 254,986

[22] Filed: Oct. 7, 1988

[51] Int. Cl.$^5$ .............................................. G06F 13/00
[52] U.S. Cl. .................................. 364/900; 364/919; 364/942; 364/942.08; 370/94.1
[58] Field of Search ... 364/200 MS File, 900 MS File; 370/94.1, 94.2; 340/825.5, 825.52

[56] References Cited

U.S. PATENT DOCUMENTS

| | | | |
|---|---|---|---|
| 4,586,134 | 4/1986 | Norstedt | 364/200 |
| 4,736,369 | 4/1988 | Barzilai et al. | 370/82 |
| 4,811,279 | 3/1989 | Bean et al. | 364/900 |
| 4,811,339 | 3/1989 | Bouillot et al. | 370/94.1 |
| 4,855,905 | 8/1989 | Estrada et al. | 364/200 |

Primary Examiner—Michael R. Fleming
Assistant Examiner—Debra A. Chun
Attorney, Agent, or Firm—Winfield J. Brown, Jr.

[57] ABSTRACT

A special purpose communications protocol processor (CPP) provides more efficient processing of layered communications protocols—e.g. SNA (Systems Network Architecture) and OSI (Open Systems Interconnection)—than contemporary general purpose processors, permitting hitherto unavailable operations relative to high speed communication links. The CPP contains special-purpose circuits dedicated to quick performance (e.g. single machine cycle execution) of functions needed to process header and frame information, such functions and information being of the sort repeatedly encountered in all protocol layers, and uses instructions architected to operate these circuits. The header processing functions given special treatment in this manner include priority branch determination functions, register bit reshaping (rearranging) functions, and instruction address processing functions. Frame processing functions so handled include CRC (cyclic redundancy check) computations, bit insertion/deletion operations and special character detection operations.

18 Claims, 16 Drawing Sheets

|           |           | Inst. n   | Execute |
|-----------|-----------|-----------|---------|
|           | Inst. n   | Inst. n+1 | Decode  20 |
| Inst. n   | Inst. n+1 | Inst. n+2 | Fetch   |

(a) Pipeline Implementation of Layers (b) Parallel Operation Instruction Definition

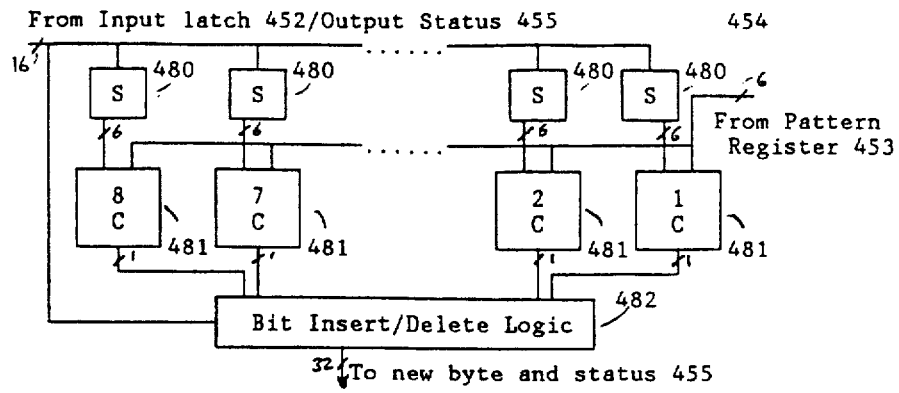

Table for Bit Insert/Delete Logic

| T | C | Input Bits PB | NB | Output OB |
|---|---|-------|----------|----------|
| 0 | 1 | 43210 | 76543210 | P7654321 |
| 0 | 2 | 43210 | 76543210 | 7P654321 |
| 0 | 3 | 43210 | 76543210 | 76P54321 |
| 0 | 4 | 43210 | 76543210 | 765P4321 |
| 0 | 5 | 43210 | 76543210 | 7654P321 |
| 0 | 6 | 43210 | 76543210 | 76543P21 |
| 0 | 7 | 43210 | 76543210 | 765432P1 |
| 0 | 8 | 43210 | 76543210 | 7654321P |
| 1 | 1 | 43210 | 76543210 |          |
| 1 | 2 | 43210 | 76543210 | 07543210 |
| 1 | 3 | 43210 | 76543210 | 10764321 |
| 1 | 4 | 43210 | 76543210 | 21076532 |
| 1 | 5 | 43210 | 76543210 | 32107654 |
| 1 | 6 | 43210 | 76543210 | 43210765 |
| 1 | 7 | 43210 | 76543210 | 54321076 |
| 1 | 8 | 43210 | 76543210 | 65432107 |

PART 1

| Present Status Count | Residue | Next Status Count | Residue | E |
|-------|---------|-------|----------|---|
| 000 |         | 001 |        0 | 0 |
| 001 | X       | 010 |       0X | 0 |
| 010 | XX      | 011 |      0XX | 0 |
| 011 | XXX     | 100 |     0XXX | 0 |
| 100 | XXXX    | 101 |    0XXXX | 0 |
| 101 | XXXXX   | 110 |   0XXXXX | 0 |
| 110 | XXXXXX  | 111 |  0XXXXXX | 0 |
| 111 | XXXXXXX | 000 | 0XXXXXXX | 1 |
| 000 |         | 111 |  6453210 | 1 |
| 001 | 0       | 000 |          | 0 |
| 010 | 10      | 001 |        0 | 0 |
| 011 | 210     | 010 |       10 | 0 |
| 100 | 3210    | 011 |      210 | 0 |
| 101 | 43210   | 100 |     4310 | 0 |
| 110 | 543210  | 101 |    54320 | 0 |
| 111 | 6543210 | 110 |   654321 | 0 |

PART 2 where
T = type of operation  Insertion=0/Deletion=1
C = Comparator (C) output number active
PB = 5 LSB's of previous byte, NB = New byte, OB = Output Byte
P = LSB of 6 bit pattern in pattern register for insertion
Count = Number of outstanding bits less than 8
        after insertion or deletion
Residue = The actual bits '0XX..X' before and after insertion
        where '0' is inserted bit from new byte
E = 1 if extra eight bits completed due to insertion
        or deletion count is eight bits
Assumptions
1) Part 1 may contain two comparator (C) output values
   to be active in which case the count and residue would
   change by two bits.
2) Part 2 is shown separately because the count is independent
   of the active comparator (C) number and that the correspondence
   is only valid for the output bits in Part 1 to the
   residue bits in part 2.

FIG. 22

SPECIALIZED COMMUNICATIONS PROCESSOR FOR LAYERED PROTOCOLS

RELATED PATENT APPLICATIONS

Patent application Ser. No. 227832, by G. T. Davis et al, filed 8/2/88, and entitled "Real-time Digital Signal Processing Relative to Multiple Digital Communication Channels", discloses a digital signal processor system for handling multiple channel streams of high speed time multiplexed digital data. Aspects thereof apply presently and are incorporated herein by this reference.

Patent application Ser. No. BC9-88-009, by G. T. Davis et al, filed together with the present application and entitled "Programmable Priority Branch Circuits", discloses and claims details of circuits which form a feature of the presently claimed invention as applied to branch processing relative to layered communication protocols, but also have general application to other data processes. Its disclosure is incorporated herein by this reference.

BACKGROUND OF INVENTION

1. Field of Invention

The field of invention is computer architecture, particularly as applicable to communications controllers. CCITT protocols supported by Open Systems Interconnection (OSI) standards are considered a basis for the architecture underlying the present invention, although other protocols such as SNA could be equally supported. Specific device areas to which this invention may be beneficially applied include network interfaces, front end communication controllers for large systems and telecommunications switching nodes. This architecture is also applicable to network gateway implementations and protocol conversion.

2. Prior art

Use of programmable communications controllers to concentrate signal traffic between multiple communications lines and data processing equipment is not per se new. U.S. Pat. Nos. 3,863,226; 4,156,796; 4,156,932; 4,188,665; 4,328,543; and 4,484,263 disclose various methods of implementing such controllers, using commercially available general purpose microprocessors as processing engines, and "off-the-shelf" asynchronous receiver and transmitter (USART) devices.

Related patent application for "Real Time Digital Signal Processing..", cross-referenced above, discloses a hardware assist mechanism to handle the media access (MAC) layer for protocol flexibility. It recognizes a need for special purpose terminal equipment to support various types of information transmission needs of the future.

However, we are unaware of any recognition in the art of the particular problem addressed here; i.e. the need for dealing specifically with header and frame processing functions repeatedly encountered in layered communication protocols, at speeds and protocol levels adequate for present and future needs in high throughput real time communication. This problem is solved presently by providing special purpose circuits and associated instructions dedicated to speeding up handling of such repeatedly encountered header and frame processing functions at all levels of todays layered protocols (e.g. OSI standards). These circuits and instructions include implementational features permitting execution of associated header and frame processing operations in single machine cycles, with flexibility suited to accommodating similar operations at the physical, data link, network, transport, session, presentation and application layers of OSI and other layered communication protocols. Those skilled in the art will recognize that the prior art above uses communication control processors which are directed to the handling of link access functions and generally rely upon more powerful processors in intermediate or host systems for processing communication protocol layers above the link access level.

More specifically, our present understanding is that contemporary general purpose microprocessors and digital signal processors, as used to implement processing engines or CPU (Central Processing Unit) elements in prior art communication controllers, were not considered suitable for handling support functions associated with processing of header and frame information in layers of today's layered communications protocols above the link control or media access layers; nor has the art apparently recognized that a need for such support exists at the link access level. We have found however that such support is needed for efficient utilization of high speed media (T-1, T-2, fiber optics, etc.). Stated otherwise, we have recognized that processing loads imposed by present and future high speed links are such that, without offloading of header and frame process functions above the link control layer, I/0 and processing bottlenecks would inevitably occur, with consequent blockage or reduction of throughput speeds limiting effective media usage.

Of course, there have been major advances in areas related to this work; e.g. improvements in microprocessor and VLSI technologies applicable to communication controls, advances in protocols per se and improvements in parallel processing. Although these might tend to alleviate the presently recognized problem, they do not provide the more effective and complete solution to which the present invention is directed.

SUMMARY OF INVENTION

The present invention concerns a special purpose Communications Protocol Processor (CPP), and a newly defined instruction architecture therefore, having dedicated units or circuit elements for implementing key header and frame processing functions frequently encountered in all layers of today's layered communication protocols. Such dedicated units perform their respective operations faster than contemporary microprocessors at modest cost compared to benefits. In addition to these special units, the CPP contains a general purpose arithmetic logic unit (ALU). The special units and associated registers provide single machine cycle execution of header and frame information processing operations which otherwise would take multiple machine cycles for execution in the ALU and which we recognize presently as major processing loads needing special handling.

Header functions receiving special attention in this manner include: Programmable Priority branch on bit operations : Branch on bit of immediate data is known, but does not provide either selection of the order of priority given to the bits which represent branching conditions or parallel evaluation of bits. U.S. Pat. No. 4,573,118 discloses a branch on bit operation with parallel evaluation of condition bit priority, but without presently featured capability for varying the priority ordering under user program control. Register reshape (Shift, mask, and swap) operations: Shifting, masking, and swapping are also known per se, but the present invention improves by performing all three functions with a single instruction, and in a single machine cycle of the system. Address processing operations: Present circuit uses instructions with associatively matched addressing for translating routing information in headers, thereby speeding translation operations and reducing storage requirements for target address information. Frame functions receiving similar treatment are: CRC (Cyclic Redundancy Check) computations: Specialized Cyclic Redundancy Check (CRC) circuits to support quick execution of error checking for various protocol. This would enable support for standard 16 and 32 bit CRC polynomials. Most standard protocols, including HDLC, DDCMP· and BISYNC, use CRC checks. These circuits are programmable to set up any polynomial. Bit insertion/deletion operations: Specialized insertion/deletion circuits provide transparency for data relative to special control characters in each protocol layer. Such transparency is needed in protocols like HDLC to isolate special control characters, denoting start and end of frame, from actual data. Special character detection operations: Dedicated circuits, used with a special instruction, provide character oriented protocol functions, as needed for most character oriented protocols including BISYNC and DDCMP.

By relegating execution of the above functions to a programmable set of newly architectured instructions acting through special units, as we have done, each unit can be used to provide the function capabilities of many universal asynchronous communications controllers (UACCs), while maintaining flexibility to handle diverse communication lines and protocols. The CPP also includes a special set of registers dedicated for data link control operations. The functions supported enhance processing of data in standard link level protocols; e.g. HDLC, X.25, SNA, TCP, etc.. State of the art pipelining and parallelism, block move, and cycle steal memory access techniques have been adopted to further enhance performance.

Above-mentioned block move techniques allow for concurrent transfer of blocks of information and processing of portions of the same information, as well as concurrent execution of other operations such as CRC (Cyclic Redundancy Check) computations, and bit insertion/deletion.

FEATURES OF THE PROCESSOR

The CPP has the ability to perform up to three operations in parallel executing with a three phase pipeline. Separate instruction and data busses permit pipelining of data references with instruction fetches. The operations may be any from the following categories.
1. Arithmetic and register transfer operations
2. Multiplier operations
3. Memory Access operations
4. Header processing for data protocols
5. Frame processing for data protocols The CPP contains four indexing address registers, twelve general purpose data registers and other special purpose protocol support registers. All registers are 32 bits wide. The processor can support 64K Words of instruction memory and 16MBytes of data memory. FIG. 3 shows a typical environment for using the advantages of subject processor. Summarizing features and capabilities of this architecture:

In addition to parallelism and pipelining for speeding up retrieval of instructions, throughput is further enhanced by providing for execution of the newly defined instructions in single system machine level cycles. Pipelining and parallelism are illustrated in FIG. 2. Care has been taken in the design of the present special purpose units to consider data and branch dependencies and provide programming capabilities to enhance performance.

Memory load/store, data shifting, multiplication and other ALU operations are done in parallel and in single processor cycles.

ADDITIONAL REFERENCES (1) Hill, F., Peterson, "*Digital Systems Hardware Organization and Design*", Prentice Hall. 1987.

(2) Beaven, P. A., "*Parallel Programmable Array Structured CRC generator*", IBM Technical Disclosure Bulletin, Oct. 1978, pp. 2058-2062.

(3) Hwang, Kai and Briggs, F. A. "*Computer architecture and parallel processing*", McGraw Hill, 1984.

(4) Tanenbaum, A. "*Structured Computer Organization*", Prentice Hall, 1984

BRIEF DESCRIPTION OF DRAWINGS

FIG. 22 shows details of the bit processing unit in FIG. 21

DESCRIPTION OF PREFERRED EMBODIMENT

CPP ARCHITECTURE

Figure 1:
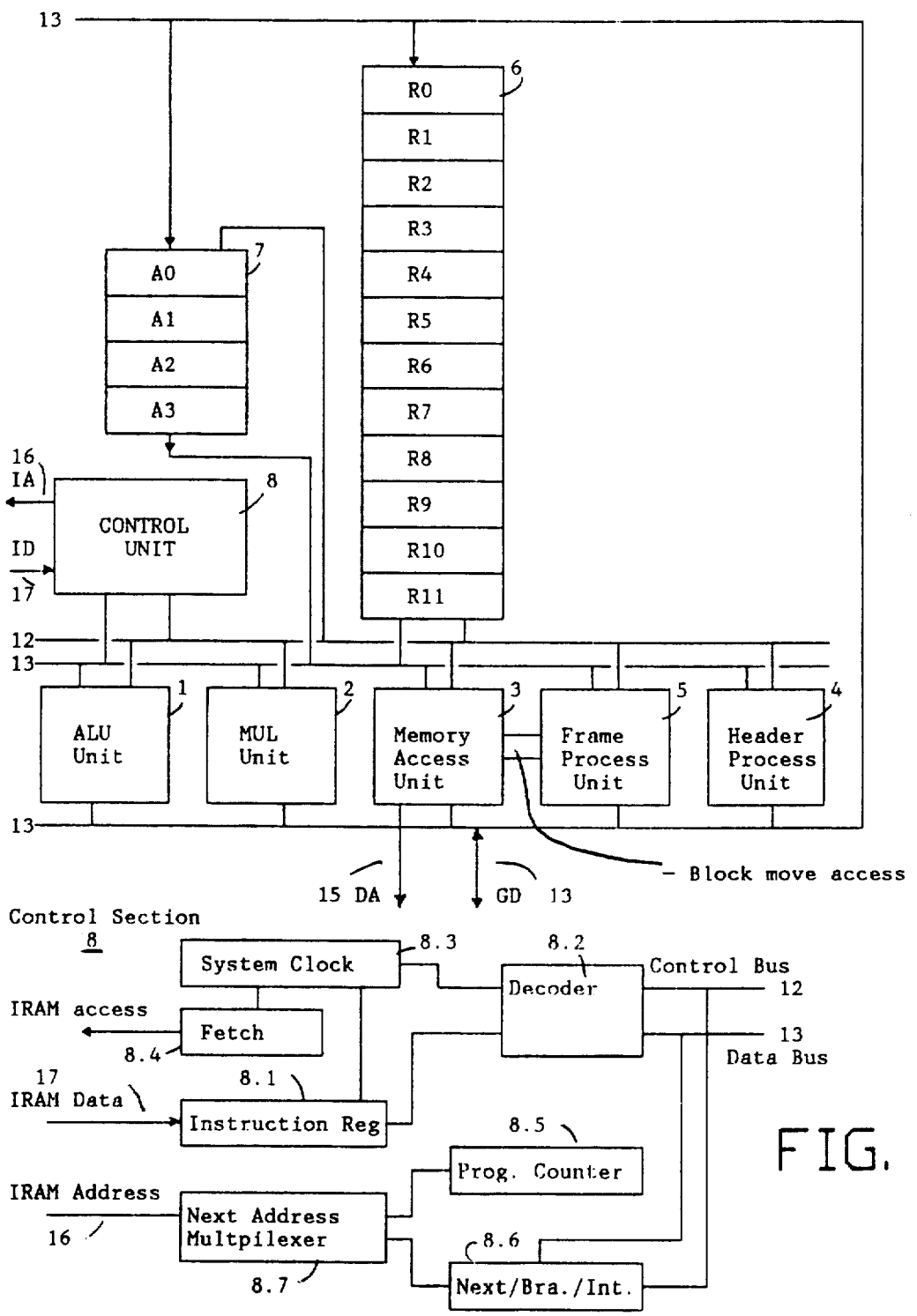
FIG. 1 is a block diagram of the CPP system illustrating associated registers and special purpose processing units.

FIG. 1 shows the overall architecture of subject communications protocol processor (CPP). Arithmetic logic Unit (ALU) 1 provides basic arithmetic operations of ADD, SUBTRACT and COMPARE, logical operations of OR, AND, and XOR (Exclusive-Or), and various register transfer operations. Multiplier unit (MUL) 2 supports 16 by 16 multiplication with scaling and rounding functions in conjunction with ALU outputs. Memory access unit 3, header processing unit 4, and frame processing unit 5 ——constituting special elements of the CPP for performance of key functions in accordance with the present invention——are described in detail later. General purpose data register stack 6 and address index register stack 7 comprise portions of internal variably allocatable storage that can be used as input and output for processing units 1–5 via control bus 12 and data bus 13.

Control Unit 8, containing elements 8.1–8.7 shown at the lower portion of FIG. 1, controls and monitors operation execution. Instruction register 8.1 receives instructions from instruction memory (IRAM) shown elsewhere. Instruction operation codes (opcodes) in this register are decoded by decoder 8.2 which generates control signals to process units 1–5 through control bus 12 and causes immediate data or address information to be transferred via data bus 13. System clock 8.3 provides timed control signals to the other elements. Fetch control 8.4 at clocked intervals directs instruction fetching action relative to IRAM.

Data bus 13 contains multiple bidirectional conduction paths allowing for parallel transfer of data between register stacks 6 and 7 and process units 1–5. Program counter 8.5 and next branch (or interrupt) control logic 8.6 generate next addresses one of which is selected by multiplexer 8.7 for application to IRAM via IRAM address bus 16. Data address (DA) 15 is used to connect memory access unit 3 to Data Ram (DRAM, also shown elsewhere), for causing transfer of data via data bus (GD) 13.

Figure 2:
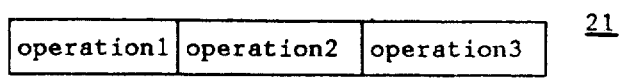
FIG. 2 illustrates prior art techniques for parallelism and pipelining to speed up processing.

Parallel execution of operations is possible using pipelining techniques suggested at 20 and 21 in FIG. 2. While instruction 'n' is being executed, a next instruction 'n+1' is decoded and the instruction following it, instruction 'n+2', is fetched, as shown at 20. In addition, if three operations are called for by one instruction, their decoding and execution may be performed in parallel as suggested at 21. Bus transfer mechanisms and pipelining techniques for such operations are well known and described in "additional references" (1), (3), and (4) above.

Figure 3:
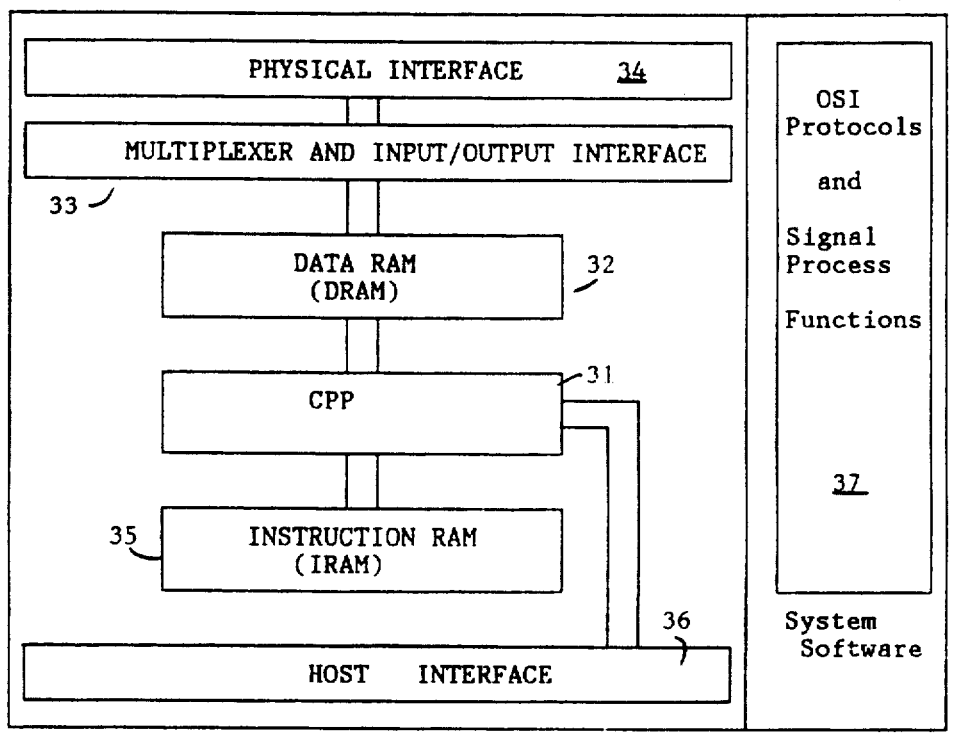
FIG. 3 illustrates a typical environment in which the CPP is expected to operate.

FIG. 3 illustrates a typical environment in which this CPP, shown at 31, would function advantageously. DRAM 32 interfaces with multiplexor and input/output interface 33 to exchange data with physical communication interface 34. IRAM 35 stores instructions of application programs for directing the CPP to perform functions dynamically required at interface 34. Host interface 36 provides for exchange of systematic handshake signals needed to sustain bidirected transfer of data and commands between the CPP and a host processing system. Block 37 represents layered protocol applications and signal processing functions which can be integrally accommodated in this environment.

Instruction Format Definition

Figure 4:
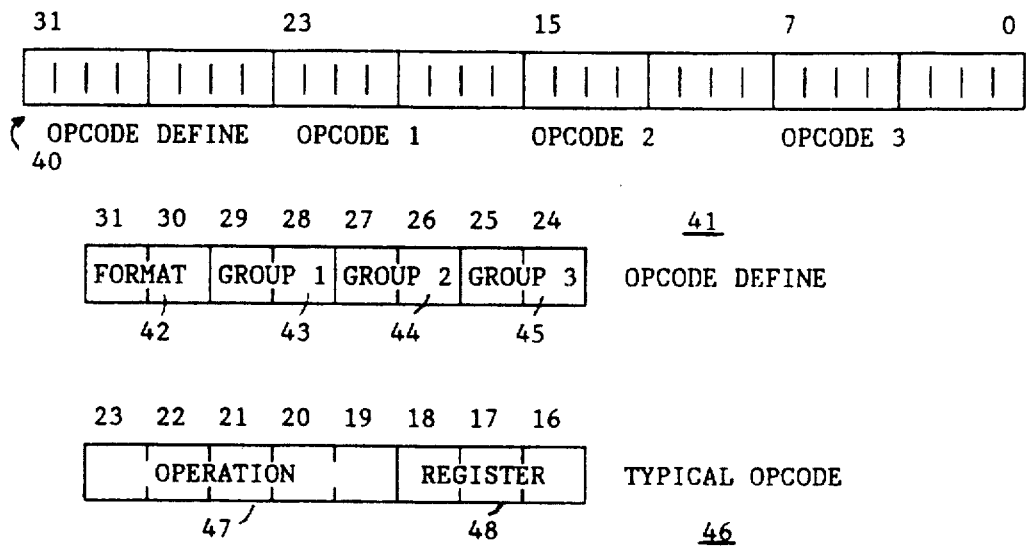
FIG. 4, illustrates CPP instruction formats.

The instruction set was designed with a fixed format and instruction length of 32 bits. FIG. 4 shows the detailed definition of bit assignments in the instruction words. A typical 32 bit instruction 40 consists of four parts or fields; a format definition field and three opcode fields, the latter calling for up to three discrete operations. Format definition field 41 consist of four parts or subfields. A 2-bit subfield 42 specifies one of three types of instruction formats as follows:

00–3 parallel operations
01–2 parallel operations with optional register and address operands
10–1 branch operation with extended addressing Subfields 43–45, 2-bits in each, specify operations in associated categories for corresponding opcode fields (1–3). Categories within each field are arithmetic computation, memory access, frame processing and header processing.

Typical opcode field 46 designates an operation via 5-bit operation subfield 47 and 3 bit register field 48.

In addition to the special purpose CPP instructions, the instruction set comprises general purpose instructions for designating ALU, MULTIPLY, and MEMORY LOAD/STORE operations, using techniques described in "additional reference" (4) by Tanenbaum.

FIGS. 6 to 14 discussed later illustrate special purpose units for performing the operations designated by subject CPP instructions. The instruction set comprises instructions with associated operations as follows.

Instruction Set (1) ALU and Memory Load store operations.
  FMn RR—load register RR From Memory using index An
  TMn RR—store register RR To Memory using index An
  RTn RR—transfer register n to RR
  ARn RR—add register n to RR
  SRn RR—subtract register n from RR
(2) Frame Processing operations.
  * CRC RR—Compute CRC on register RR
  * BSW RR—perform bit insertion/deletion using RR
  * BCD RR—branch if RR has a special character
(3) Header Processing operations.
  * BBD RR,X—branch on priority bit detect in RR, X is the stack selection parameter.
  * RSH RR—reshape register RR
  * ARS RR—compute new address using RR
(4) Block Move operation
  * BMO RR—perform block move with queue command in RR
(5) Parallel operations
  ** EP3 OP1<RR>,OP2<RR>,OP3<RR>— three parallel operations

```
**   EP2  OP1<RR>,OP2<RR>—two parallel
     operations
**   EP1  OP1<RR>—one operation
*  - Above instructions and their execution are considered new features
of hardware and methodology of the present invention.
** - OP1, OP2, and OP3 above are individual operations.
```

Register Structure

This table shows register assignments and functions.

| REGISTER | FUNCTION |
|---|---|
| A0 to A3 | MEMORY ACCESS AND INDEXING REGS. |
| R0 to R11 | GENERAL PURPOSE DATA REGISTERS |
| CRCP | CRC POLYNOMIAL REGISTER |
| CRCA | CRC ACCUMULATOR REGISTER |
| BSHP | BIT TRANSPARENCY PATTERN REGISTER |
| BSHS | BIT TRANSPARENCY STATUS REGISTER |
| RSHC | RESHAPE CODE REGISTER |
| SRC | SOURCE ADDRESS FOR BLOCK MOVE |
| DST | DESTINATION ADDRESS FOR BLK. MOVE |
| CNT | BUFFER LENGTH FOR BLOCK MOVE |
| LCIR | LOGICAL CHANNEL ID FOR ADDRESS |

The following sections describe circuits for executing Instructions marked "*" in the above list.

Header Processing Unit

Figure 5:
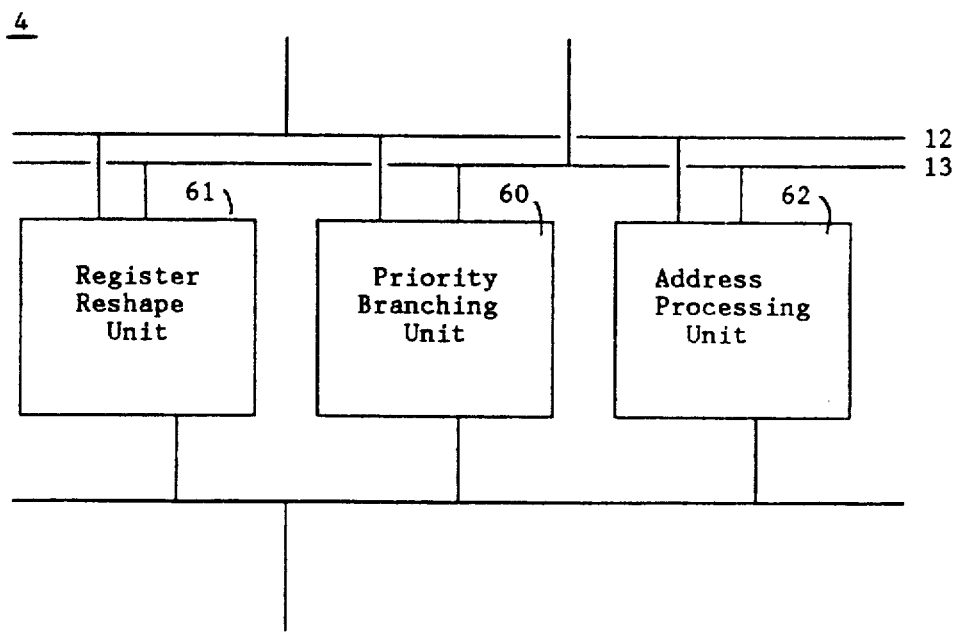
FIG. 5 illustrates the CPP header processing unit.

FIG. 5 shows components of a header processing unit 4 (see previous discussion of FIG. 1). Branch On Priority Bit Detect (BBD) unit 60 provides a mechanism responsive to associated BBD instructions (see list above) to implement the operations for branching program execution as a function of condition bits designating branch conditions, and featuring priority selection of the bits representing active conditions based on priority selection data which can be programmably preloaded into registers in this unit. This unit is described and separately claimed in BC9-88-009 previously cross-referenced.

Register reshape unit 61 rearranges registered data to extract required parameters in a format suited for evaluation. Address routing unit 62 translates header address information as needed for establishment of connections and network routes through the various protocol layers.

BBD Unit

Figure 6:
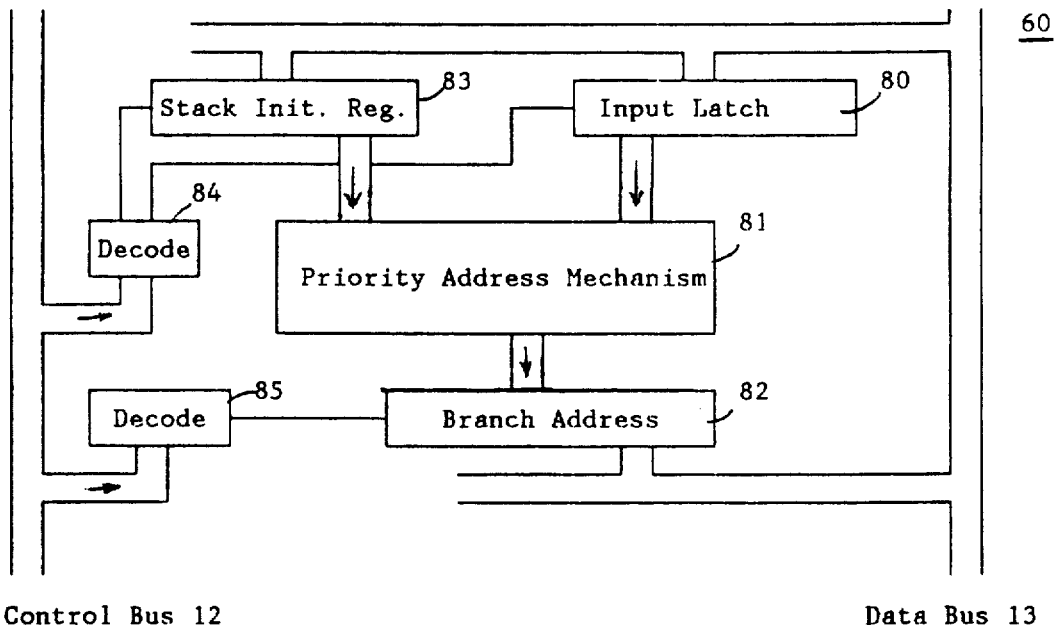
FIG. 6 illustrates a CPP unit for executing branch on priority bit detect (BDD) instructions as presently defined.

As shown in FIG. 6, information in input latch 80, representing various system conditions and/or interruption request events, is processed in accordance with a predetermined priority ordering of respective latched bits, for branching the program execution of the system to a next instruction address representing the beginning of a program routine for dealing with the selected condition. Priority select mechanism 81 determines which of the bits in latches 80 representing active conditions (requiring branching action) has highest priority and operates to select an instruction address from associated address register stack shown elsewhere for transfer to output register 82. Stack initialize register 83 is used to initialize address stack elements (shown elsewhere) in the priority address mechanism 81. Decoders 84 and 85, responsive to the BBD instruction opcode on control bus 12, generate control signals for gating input latch 80 to the priority address mechanism and for gating outputs of that mechanism to branch address register 82. Decoder 84 responsive to instructions designating register transfer operation generates control signals to load stack initialize register 83 via data bus 13.

Figure 7:
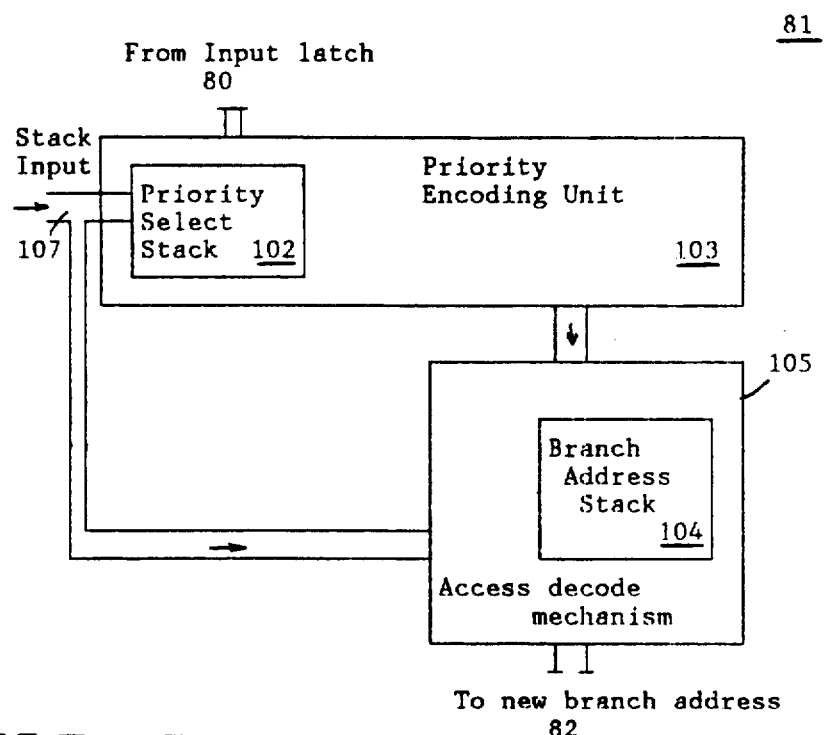
FIG. 7 illustrates a priority address mechanism in the unit of FIG. 6.

FIG. 7 describes the priority mechanism 81 of FIG. 6. A feature of this mechanism is the programmability of its priority ordering function as determined by priority select stack 102. Values programmably loaded into stack 102 determine the relative priorities of active condition bits in latches 80, and actuate the priority encode unit 103 to select an address from branch address stack 104 in access decode mechanism 105 in response to said BBD instruction. The selected address, associated with the active bit in latches 80 having highest priority value set in its associated register within stack 102, is transferred to output register 82 as the address of the next instruction to be executed; thereby initiating a branch routine suited to the selected branch condition.

This priority mechanism is further described and separately claimed in the cross-referenced application for "Programmable Priority Branch Circuits". Another feature of this mechanism is that it is arranged to perform its foregoing address extraction operation (to locate the selected branch target instruction), in a single machine cycle of the CPP system. Stacks 102 and 104 can be initialized via data path 107, in response to standard block move instructions. As another feature, these stacks can be provided with multiple segments relative to latches 80, and thereby consolidate loading operations for establishing multiple sets of priority and address associations relative to bit positions in latches 80. Such consolidation provides the additional benefit of permitting selection of stack segments by BBD instructions, so that priority ordering and/or branch address associations may be dynamically varied without repeated loading of either stack (e.g. to support multiple protocols); thereby further improving system adaptability and throughput.

Figure 8:
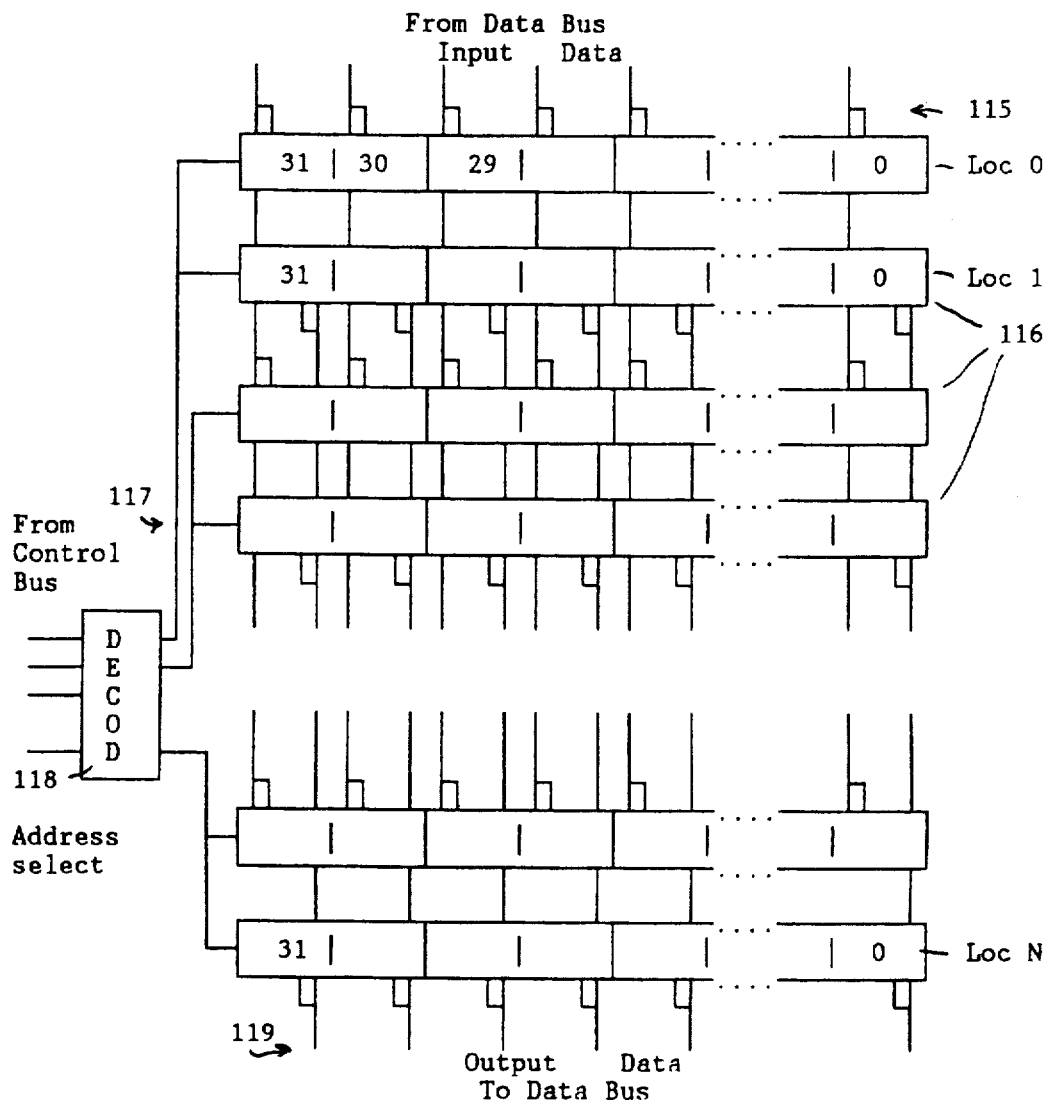
FIG. 8 illustrates an address stack array addressed by the priority encoder of FIG. 7.

FIG. 8 shows the mechanism to access branch address stack 104; the latter shown in this figure at 116 and its input path 107 shown here at 115. To initialize stack 116, decoder 118 (corresponding to decoder 84 in FIG. 6) processes information from register loading instructions to gate data from bus 115 to a selected register in the stack. To read an address from the stack, another decoder (not shown, but corresponding to decoder 85 in FIG. 6) reacts to the highest priority select value in stack 102 (FIG. 7), in response to a BBD instruction, to select output from an associated register in stack 116 for transfer to output register 82 via output data bus 119. As noted earlier, in order to support plural protocols, stack 116 may contain plural segments, each loadable with a different set of branch addresses, for relating different sets of branching functions to sets of conditions in input latch 80. This requires providing information in BBD instructions for designating selection of different segments.

Figure 9:
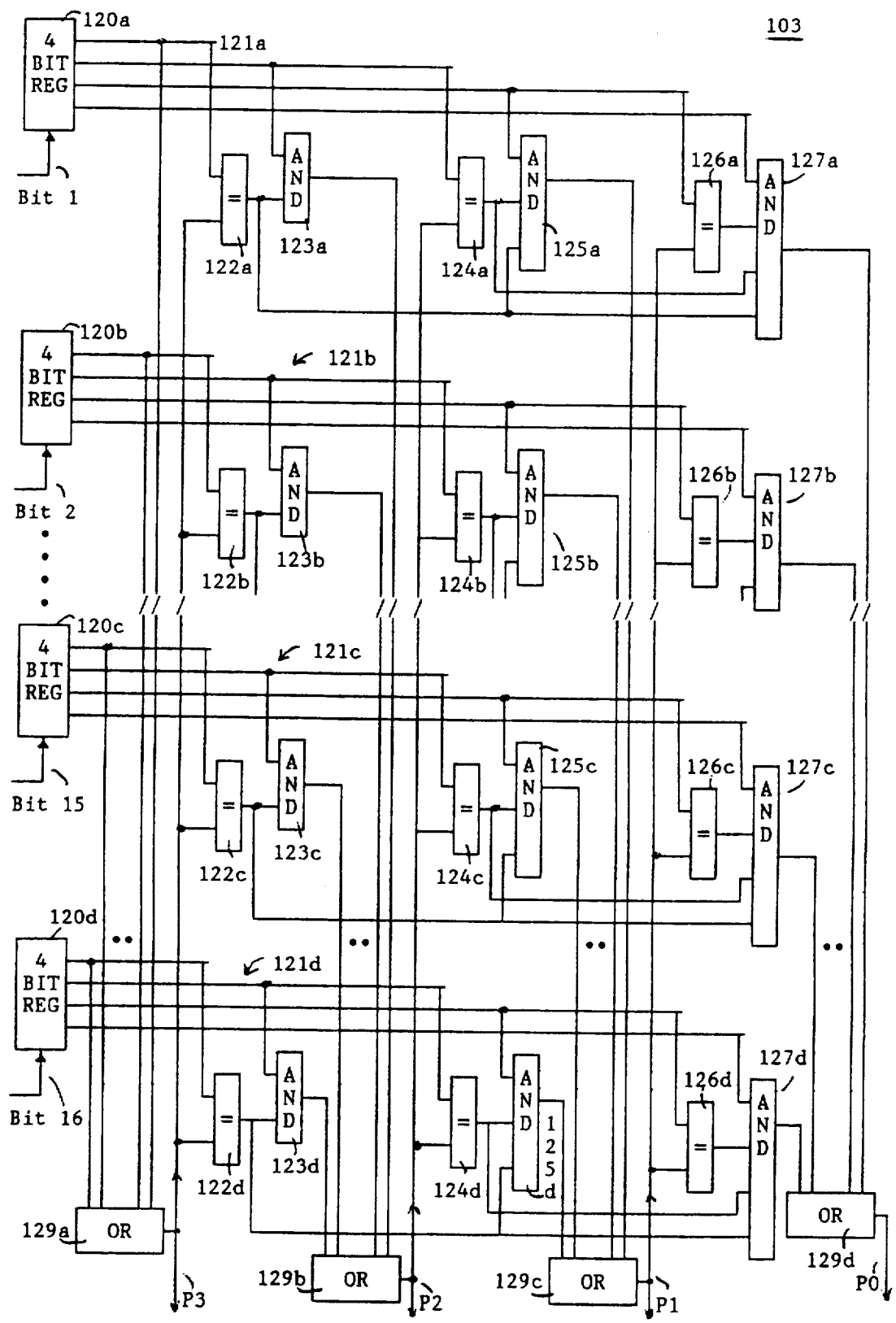
FIG. 9 shows details of the priority encoder of FIG. 7.

Details of a programmable priority encoder unit 103 are shown in FIG. 9. Bits from input latch 80 (FIG. 7), labeled bit 1, bit 2, ..., bit 16, serve as selection control inputs relative to associated priority select registers 120a through 120d (bit 1 activating 120a, bit 2 activating 120b, ..., and bit 16 activating 120d). Priority select code values in registers 120a through 120d (each 4-bits) may be initialized in response to register loading instructions of the processor, such as Data Move instructions (Register to Register or Memory to Register) or Load Immediate instructions. Multiple registers 120x may be initialized in parallel since the processor data bus will typically carry many more bits than can be used in a single priority select register.

As noted previously, the purpose of initializing the priority registers 120x is to allow for programmably varying priorities associated with the condition bits in input latch 80. Since there are 16 condition bits in the illustrated embodiment, 4 bits are needed per priority select register to be able to assign unique priority select rankings to all condition bits. In general, N priority select bits would be needed relative to a set of condition bits having a length of 2 to the Nth power.

In response to BBD instructions, values loaded into registers 120x associated with input bits in active state, are gated out to respective logic circuits 122x through 127x. The latter operate in effect to compare received magnitudes and gate as final output the largest magnitude; i.e. the highest priority value. Thus, for instance, if the highest priority select value is held in register 120b, and bit 2 is on or active, the value in 120b will be gated through the array 122x-127x, regardless of the other values held in registers 120.

With input latches 80, registers 120x and address stack 116 (FIG. 8) pre-loaded, the circuit is prepared for execution of the BBD instruction operation. In response to such instruction, array 122x-127x in FIG. 9 effectively selects the highest priority select value in registers 120x associated with the respective input latch bit in active condition representing the highest priority branch condition or event. Bits of the selected value are gated to outputs P0, P1, P2, and P3 (P3 being the most significant bit) which act through a not-shown decoder (corresponding to decoder 85 in FIG. 6) to address output of an associated register in stack 116 (FIG. 8) and thereby transfer the respective address to output register 82.

More specifically, the operation of the array of gates proceeds as follows: active or "ON" input bits——Bit 1, Bit 2, ..., Bit 16——from input latch 80 enable outputs of associated priority select registers 120x to be transferred to associated rows of gates 122x -127x. Input latch bits which are inactive or "OFF" will force outputs of the associated priority register to be "OFF". Outputs from priority regis -ters 120x are compared by respective rows of gates, starting with the most significant bit. OR gate 129a examines the most significant bits of the active priority registers 120x, and sets output P3 "ON" if at least one of its inputs is "ON". Output P3 feeds back to Compare gates 122a, 122b, 122c. . . . Output of each Compare gate 122x will be turned "ON" only if the most significant bit from the corresponding priority register 120x is at the same logic level ("ON" or "OFF") as Encoder output P3. All input bits for which the corresponding Compare gate outputs are "OFF" are eliminated from further consideration in determining the other encoder outputs P2, P1, and P0 since an "OFF" state at the output of Compare gate 122a, 122b . . . causes AND gates 123a, 125a, 127a, 123b, 125b, 127b, . . . to block further propagation of priority register 120a, 120 b . . . outputs. In like manner, each lower order bit from each of the priority registers 120x is processed, but only after degating those register outputs eliminated in processing the previous priority bit. Thus outputs of AND gates 123a, 123b . . . correspond to the second to the most significant bit for those Inputs Bit 1, Bit 2 ... which are active and which have a priority number with the most significant bit set to the same state as Output P3. OR gate 129b generates Encoder Output P2 based on inputs from AND gates 123a, 123b . . . . Compare gates 124a, 124b . . . eliminate additional priority numbers for which the second bit does not match, and AND gates 125a, 125b . . . for remaining priority numbers drive OR gate 129c to generate Encoder output P1. In a like man- ner, Compare gates 126a, 126b . . . eliminate additional pri- ority numbers for which the third bit does not match, and AND gates 127a, 127b . . . for remaining priority numbers drive OR gate 129d to generate Encoder output P0.

As mentioned previously, outputs P0-P3 are used to address the address register stack with an encoded 4-bit value which represents a highest active branch condition. Alternately, outputs of AND gates 127a, 127b, . . . , could each be associated directly to registers in the register stack and could, when activated, gate the output of the corresponding address register to the address bus. This is possible because only one of the AND gate outputs 127x may be activated at any one time, unless two priority registers are loaded with the same number (something which should not be done). This alternative would prioritize the address selection in accordance with positions of the active input latch bits per se, rather than numbers programmably associated with those bits. Note that in the alternative configuration the lowest priority input latch bit, that in latch position 1 for instance, would be given priority only if no other bit is active. Since only 15 non-zero selection functions can be formed from 16 latch bit positions, simple logic can be added to check for a condition of all latch bits equal 0 and in that circumstance gate an output for selecting a branch target address associated with absence of active conditions, if a unique branch in that circumstance is required.

The Register Reshape Instruction Circuit

Figure 10:
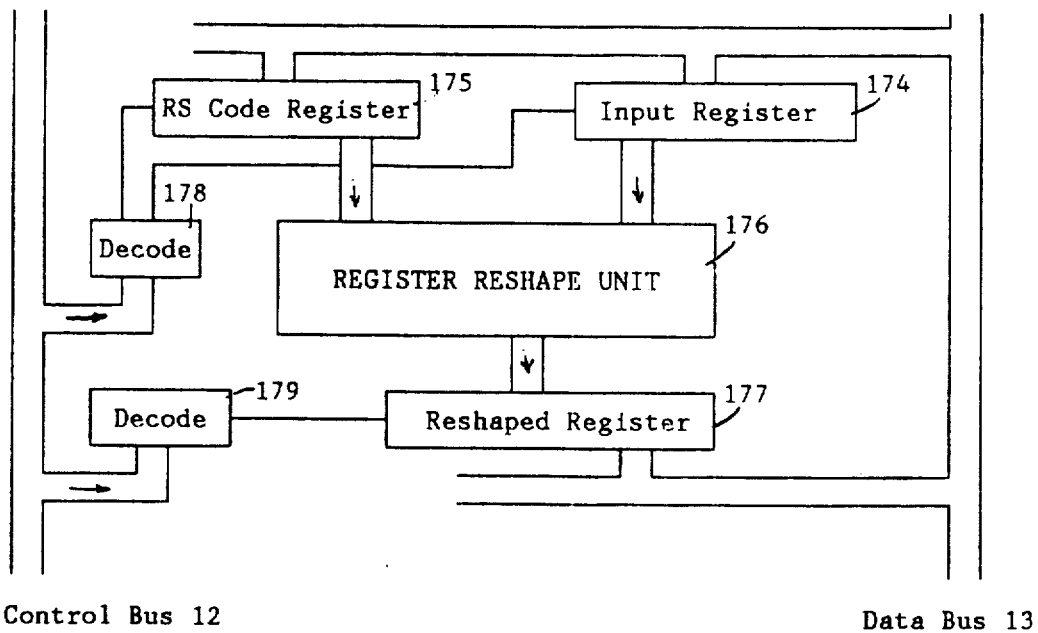
FIG. 10 illustrates a register reshape unit for executing register reshape (RSH) instruction operations.

Circuits for execution of the Register Reshape (RSH) instruction are shown in FIG. 10. Information in input latch 174 is reshaped as per the code in Reshape (RS) code register 175 by operation of Register reshape unit 176. Output is sent to output register 177. The RS code register is initialized via data bus 13 with a suitable shift, mask and swap operation before execution of associated RSH operations. Decoders 178 and 179, responsive to the RSH instruction opcode on control bus 12, generate control signals for gating input latch 174 to register reshape unit 176 and also for gating the output from the reshape unit register 177. Decoder 178 responsive to a register transfer operation via data bus 13 generates the control signal to load register 175 with data designating the reshape options.

Reshape options that can be coded into register 175 (assuming a 32 bit input register) include:

(1) Swap 8 least significant bits
(2) Swap 16 least significant bits
(3) Swap 32 least significant bits
(4) Rotate N bits
(5) Mask M most significant bits SWAP L bits here means bits D(0) to D(L), in the input register, would be interchanged according to the relationships:

D(L)   = D(0)
D(L − 1) = D(1)
.
.
D(1)   = D(L − 1)
D(0)   = D(L)

ROTATE N Bits above means bits in the input register are shifted right or left N bit places per:

Shift right N means D(i)=D(i+N); i is the ith bit
Shift left N means D(i)=D(i-N); i is the ith bit
MASK M bits above means set a specified number of bits to 0 or 1, beginning with the most significant or least significant bit.

The reshape code register to satisfy the above options would appear as below.

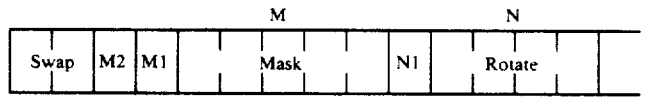

N1 indicates direction of shift
M1 indicates set or reset for Mask
M2 indicates from MSB or LSB for Mask M and N represent number of bits, maximum 32
Swap Code
001 - Least 8 bits
010 - Least 16 bits
011 - All 32 bits
100 - Most Significant 8 bits
101 - Middle 16 bits
110 - All 32 bits Example: In the register shown above, assume we need to extract the packet number

The reshape code would be,

| 0 | 0 | 0 | 0 | 0 | 1 | 1 | 1 | 1 | 0 | 0 | 1 | 0 | 0 | 1 | 0 | 0 |

N = 4 shift four bits
N1 = 1 shift direction right
M = 28 Mask 28 bits
M1 = 0 Reset Mask for 0
M2 = 0 Start Mask from MSB
Swap Code = 000 No Swap AHPL (A hardware progamming language) has been used here to define the logic of the reshape unit. Described below is AHPL data for the reshape register construct. Chapter 5 of "Additional Reference" (1) discusses details of this language.

| MODULE: | RESHAPE REGISTER |
|---|---|
| INPUTS: | resdecode */ res instruction decode line |
|  | Rn */ any register n |
|  | RSHC */ reshape code register -175 |
| OUTPUTS: | Rm [16] |
|  | */ any register m |
| BUSSES: | SWAPOUT [32]; |

-continued

| 1. Rm < - RSH [Rn]. |
|---|

Figure 11:
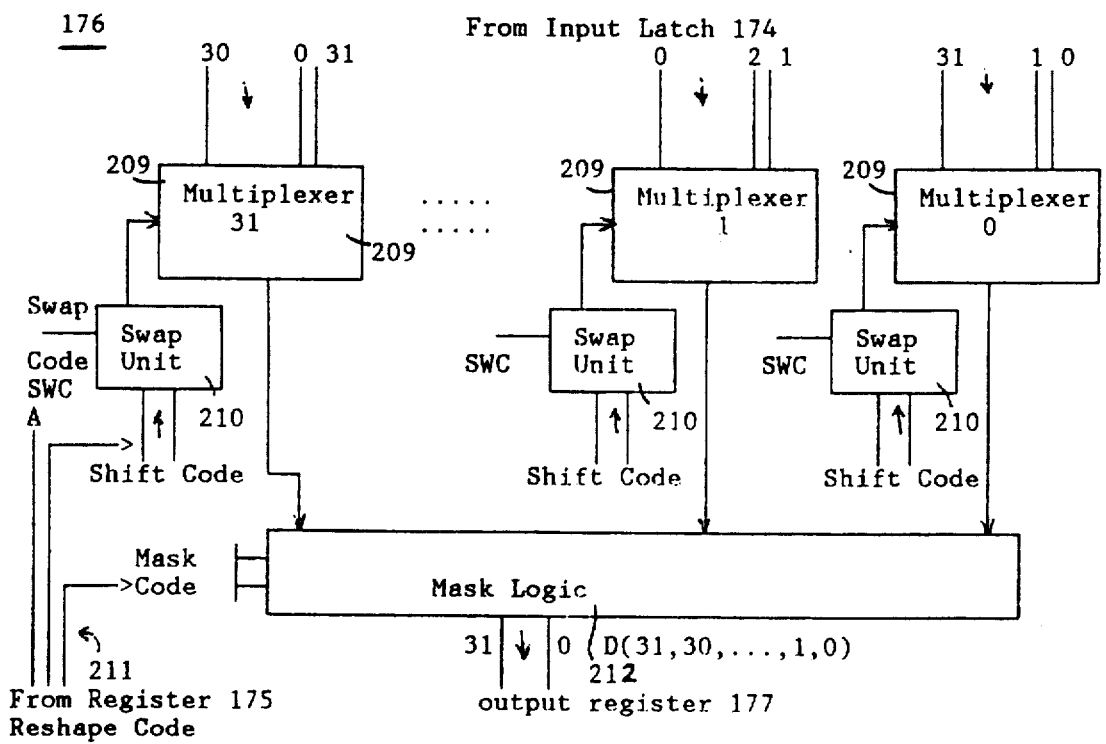
FIG. 11 illustrates a swap and rotate multiplexer in the reshape unit.

The RSH computation logic contains two stages as shown in FIG. 11. The first stage consists of a set of multiplexers 209, each with inputs from latch 174 relatively shifted in position by one bit. Swap units (32 of them) use the shift code and the swap code from the reshape code register ( Block 175 in FIG. 10) to provide different selection control inputs to the multiplexers 209. The second stage consists of the mask logic 212 that is con- trolled by the mask code from reshape code register 175 (FIG. 10) to provide the proper set/reset to the sequence of bits desired. Mask logic 212 can be described by the following relations.

Let output word vector D(L) be of length L bits, let M specify mask code, M1 specify set/reset, and M2 specify right/left. Then D(i) = 1 if M1 = 1 for i > M if M2 = 0 or i < M if M2 = 1 or D(i) = 0 if M1 = 1 for i > M if M2 = 0 or i < M if M2 = 1

For all other values D(i) will be the same as the ith multiplexer 209 in FIG. 11.

Figure 12:
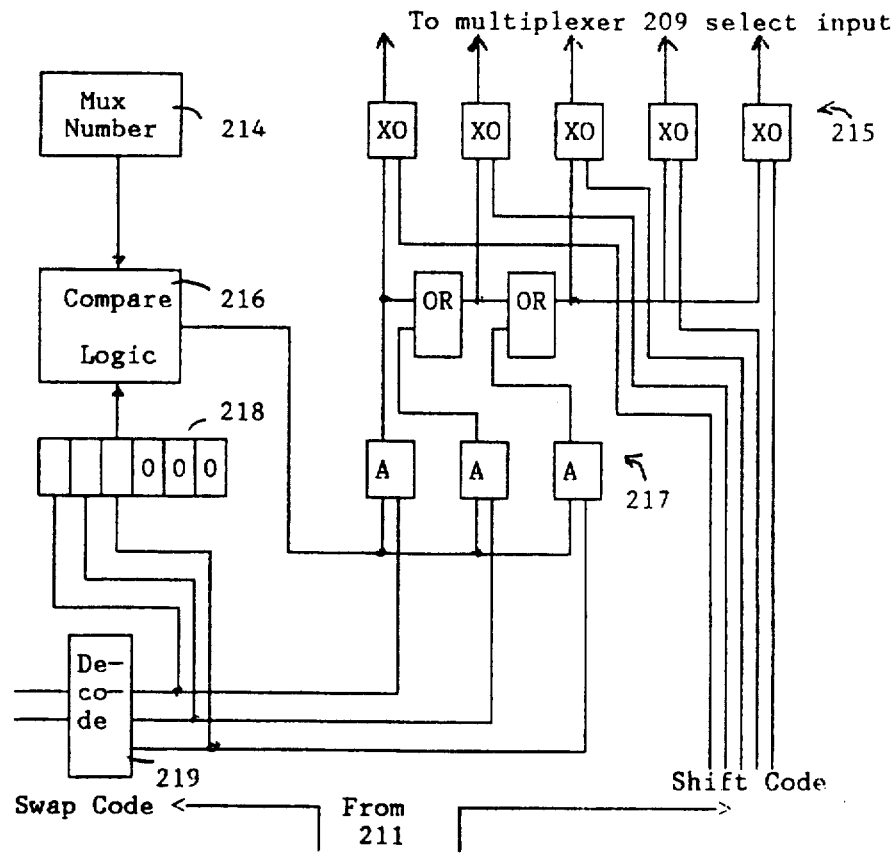
FIG. 12 shows a swap unit element of the reshape unit.

FIG. 12 shows details of the swap unit. Decoder 219 uses the swap code to select one of the AND gates 217 to provide the desired range of bit swap; 8, 16 or 32 bits. Compare logic 216 uses decoder 219 output in conjunction with register 218 and output of the associated multiplexer number 214 to determine whether the swap unit is to perform a swap function relative to that multiplexer. The shift code is exclusive-ORed with outputs of AND gates 217 at 215 to provide the multiplexer output address which selects 1 of 32 of the multiplexer inputs to be the output. XOR gates 215 complement the least significant 3, 4 or 5, bits of the shift code depending on the swap code requested.

Figure 13:
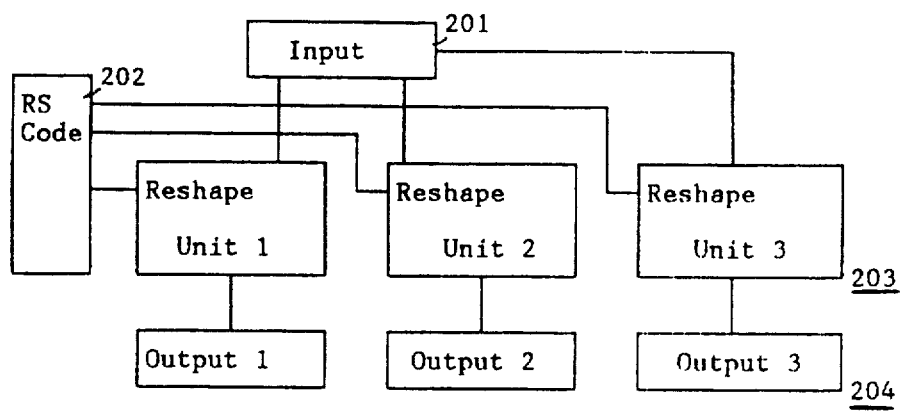
FIG. 13 illustrates another embodiment of the reshape unit allowing for multiple parameter extraction.

FIG. 13 is an extension of the reshape mechanism for allowing extraction of multiple parameters at a time. This variation uses a reshape code register with the following functions to provide a speedier operation. Input register 201 is common for all but there are three output registers 204 processed by three reshape units 203. The reshape code register 202 would then contain three separate codes to extract the three parameters (one for each reshape unit).

The ARS Instruction Circuit

Figure 14:
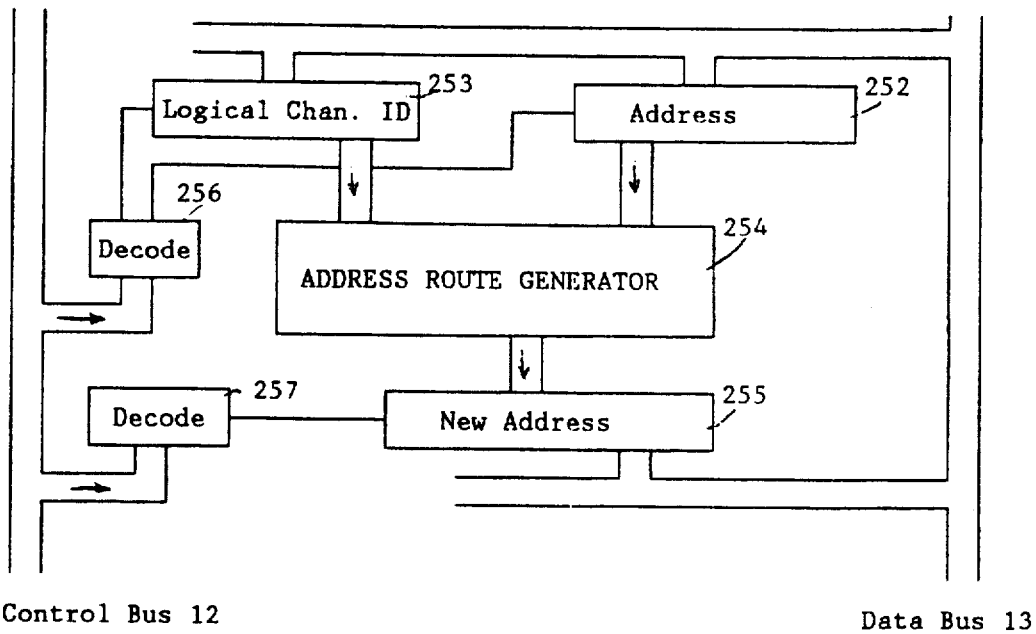
FIG. 14 illustrates an address routing unit for executing operations called for by Address Routing (ARS) instructions.

This circuit is shown in FIG. 14. Information in input latch 252 is processed for address translation. The logical channel ID 253 is used by address generator 254 to generate the actual routing address 255. Decoders 256 and 257, responsive to the ARS instruction opcode on control bus 12, generate control signals for gating input latch 252 to the address route generator 254 and also to latch the output to the route address 255. Decoder 256, responsive to a register transfer operation via data bus 13, generates the control signal to load the logical channel ID 253.

Figure 15:
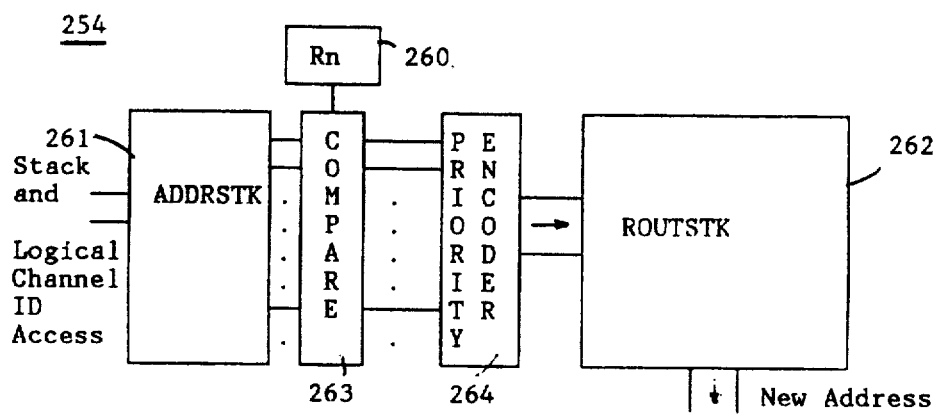
FIG. 15 illustrates elements of the address route unit.

Described below is an AHPL data notation description for the logic to control address routing operation. FIG. 15 describes the hardware used for the operation. The address stack 261 and the route stack 262 are initialized with address conversion parameters with one to one correspondence. This allows compare circuit 263 in conjunction with priority encoder circuitry 264 to use the input register Rn 260 value to select a corresponding routing address in the route stack 262 which can be sent to the output register (Block 255 in FIG. 14). A stack access decode mechanism similar to the one in FIG. 8 is used to initialize the address and route address stacks.

ory beginning at the source address, can be stored in the count register 348.

Figure 23:
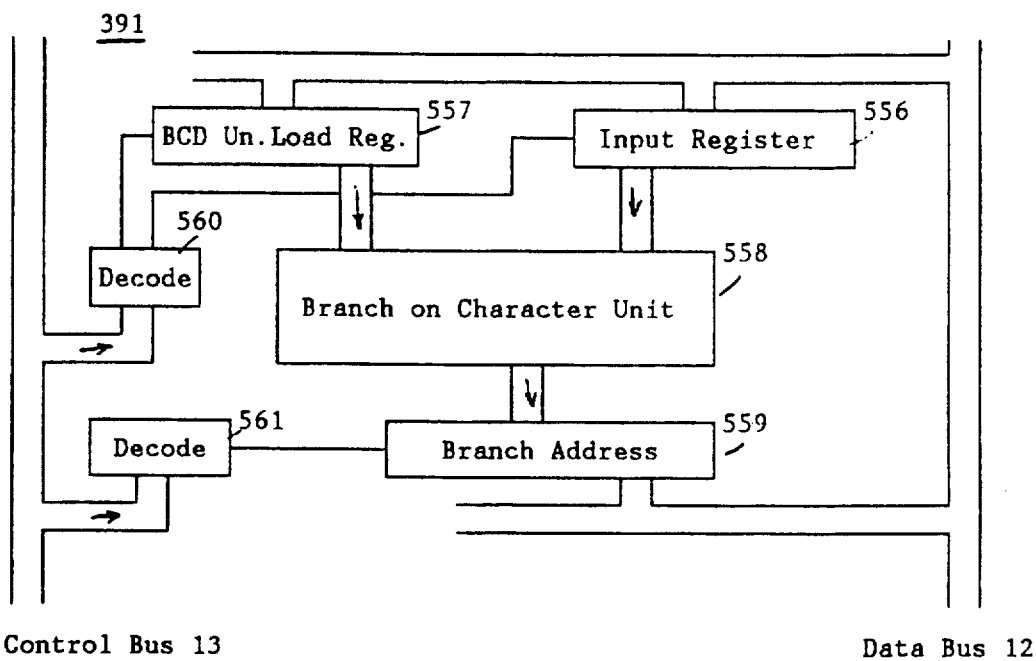
FIG. 23 illustrates a unit for branch on control character detect operations.

The circuit permits block move requests to be queued in a stack. The queue command register 349 inserts the contents of 346, 347 and 348 into the queue. It also permits the user to specify if data translation is desired (e.g. for cyclic redundancy check or bit insertion/deletion) in conjunction with the block move so that the paths 354 to the frame process unit (Block 5 in FIG. 1) are enabled. The registers 346, 347, 348 and 349 can be loaded with a register transfer operation using data bus 13. Decoders 352 and 353, responsive to block move instruction opcode on control bus 12, generate the control signals for gating registers 346, 347 and 348 for loading into the block move circuit 350 using the queue command register. Decoder 352 responsive to a register transfer operation. via data bus 13 generates the control signal to load from the block move circuit 350 the block move status register 351 which indicates the status of the block move function. The data address path 15 is used for addressing the external DRAM (Block 32 FIG. 3) and internal stacks (FIGS. 7, 15 and 23).

Figure 18:
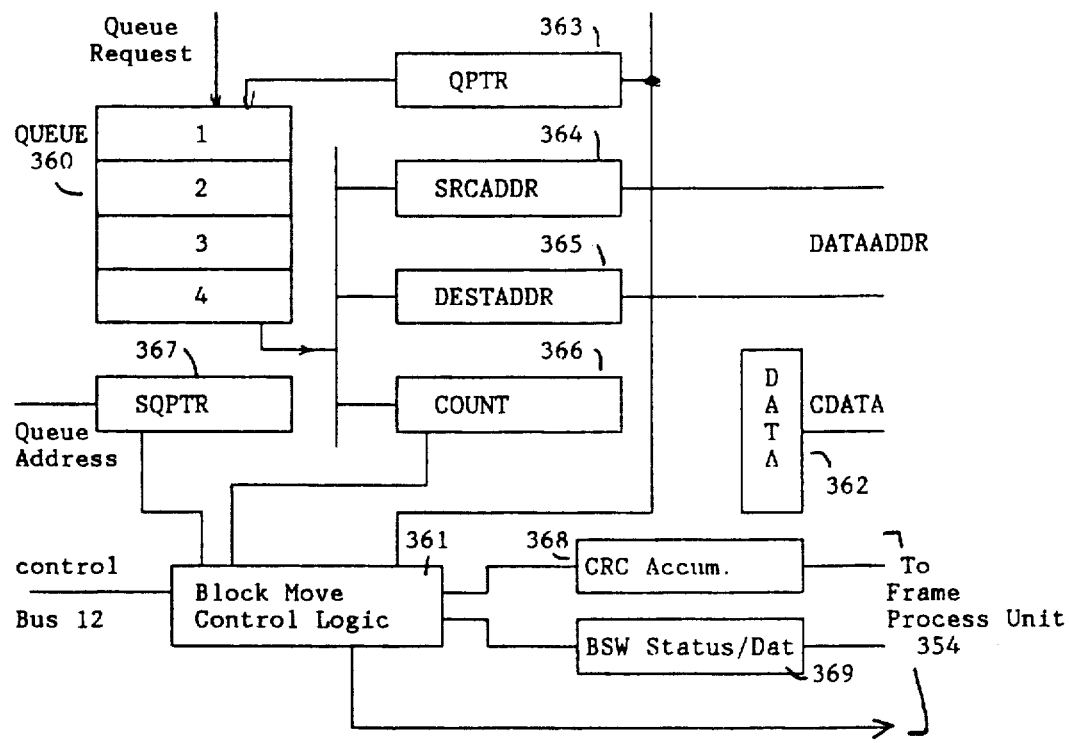
FIG. 18 illustrates a controller for block move operation.

Described below is an AHPL sequence for constructing the controls of the block move logic 361. FIG. 18 describes details of circuits used in the AHPL sequence. Different sets of block move requests are stored in first come first served order using queue 360. Queue pointer 363 points to location of request currently processed by

```
MODULE:                         ADDRESS ROUTE INSTRUCTION
MEMORY: ADDRSTK<64>[16]         */ address stack 64 words
ROUTSTK<64>[16]                 */ route stack 64 words
INPUTS: arsdecode               */ ARS instruction decode line
Rn                              */ any register
OUTPUTS: Rm                     */ any register
BUSSES: CMPBUS[8]               */ compare bus
    1. Rm <- ARS[Rn].
    ARS(Rn) = DCD(PRIORITY ENCODE (CMPBUS)) * ROUTSTK
    */ PRIORITY ENCODE is the standard priority encode
    CMPBUS(64) = (V(Rn.XOR.ADDRSTK(1))) */ compare
    (V(Rn.XOR.ADDRSTK(2))) */ characters
    (V(Rn.XOR.ADDRSTK(3)))
    (V(Rn.XOR.ADDRSTK(4)))
    (V(Rn.XOR.ADDRSTK(61)))
    (V(Rn.XOR.ADDRSTK(62)))
    (V(Rn.XOR.ADDRSTK(63)))
    (V(Rn.XOR.ADDRSTK(64)))
```

Memory Access Unit

Figure 16:
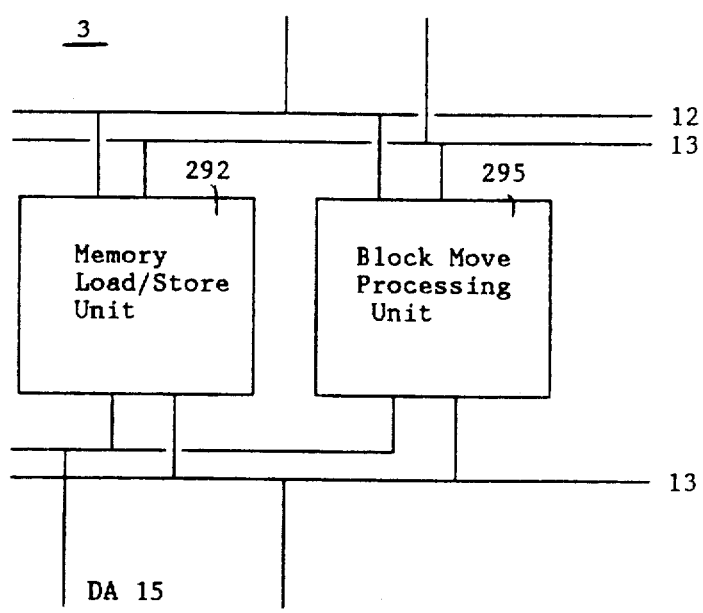
FIG. 16 illustrates the memory access unit of the CPP.

FIG. 16 provides a block schematic of the memory access unit which consists of the block move unit 295 and memory load store unit 292. Memory load store unit 292 provides standard data memory access as in commonly implemented microprocessors within prior art as in reference (4).

The BMO (Block Move) Instruction Circuit

Figure 17:
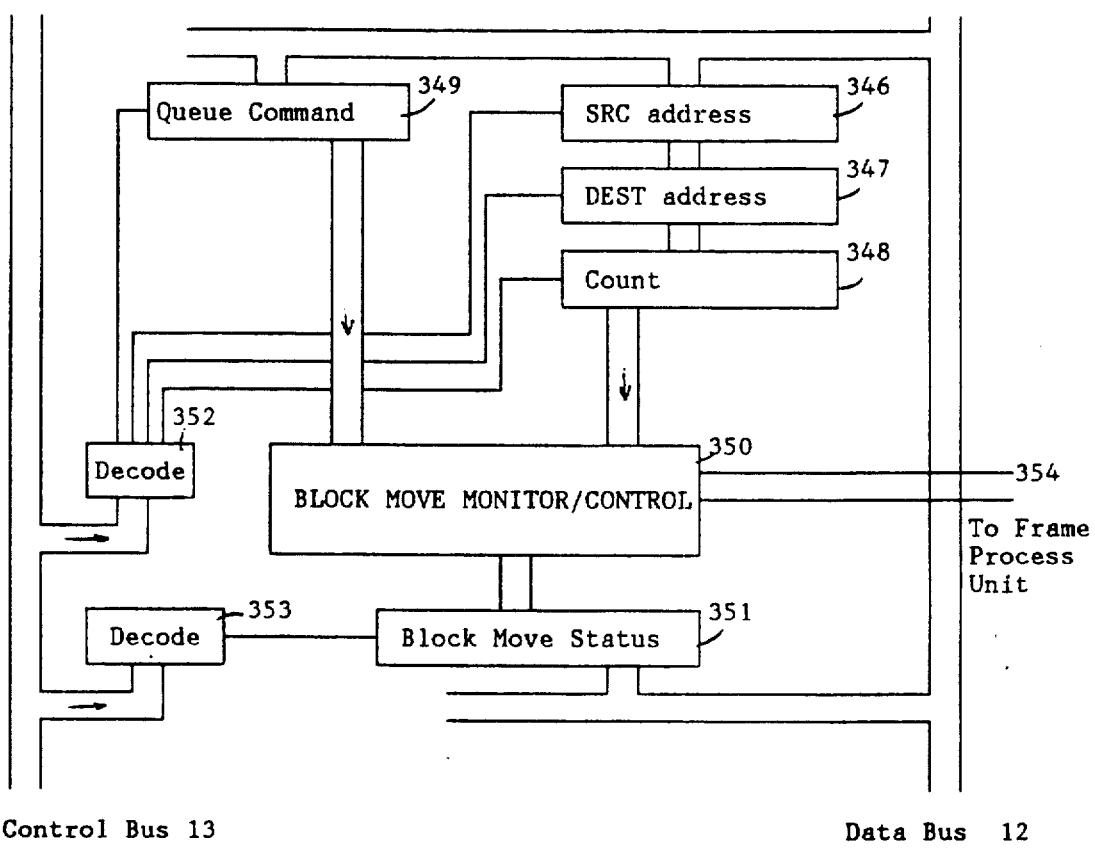
FIG. 17 illustrates a block move unit for the CPP.

This circuit is shown in FIG. 17. Source address register 346 can be loaded by a register transfer instruction with the start address location of a data block. Block move status register 351 is updated by monitor unit 350 as the move proceeds. The block move circuit includes a mechanism to transfer data between source and destination addresses with data translation. Source address 346 is the first memory location where source data resides. Destination address 347 is the first memory location to which data is sent. The buffer length, which is the number of data bytes to be transferred from memthe block move circuit. Software queue pointer 367 points to the last request submitted to the queue for block move action. Block move status 351 will indicate when the queue 360 becomes empty or full, depending on positions of the hardware and software queue pointers 363 and 367. The data translation registers for bit insertion/ deletion 369 and cyclic redundancy check 368 are used when frame processing is enabled relative to path 354.

Figure 20:
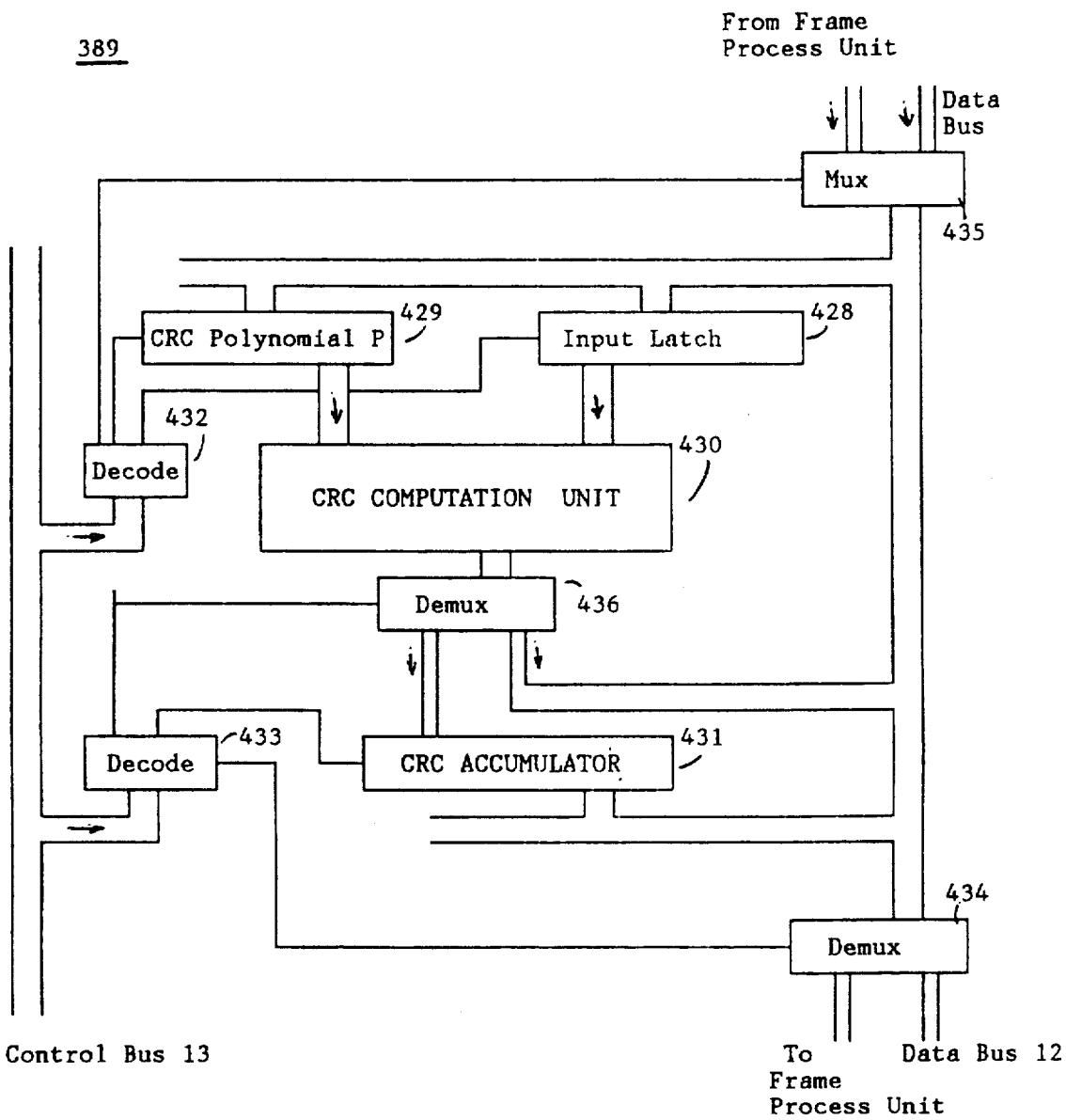
FIG. 20 illustrates a unit for single cycle execution of cyclic redundancy check (CRC) computations.
Figure 21:
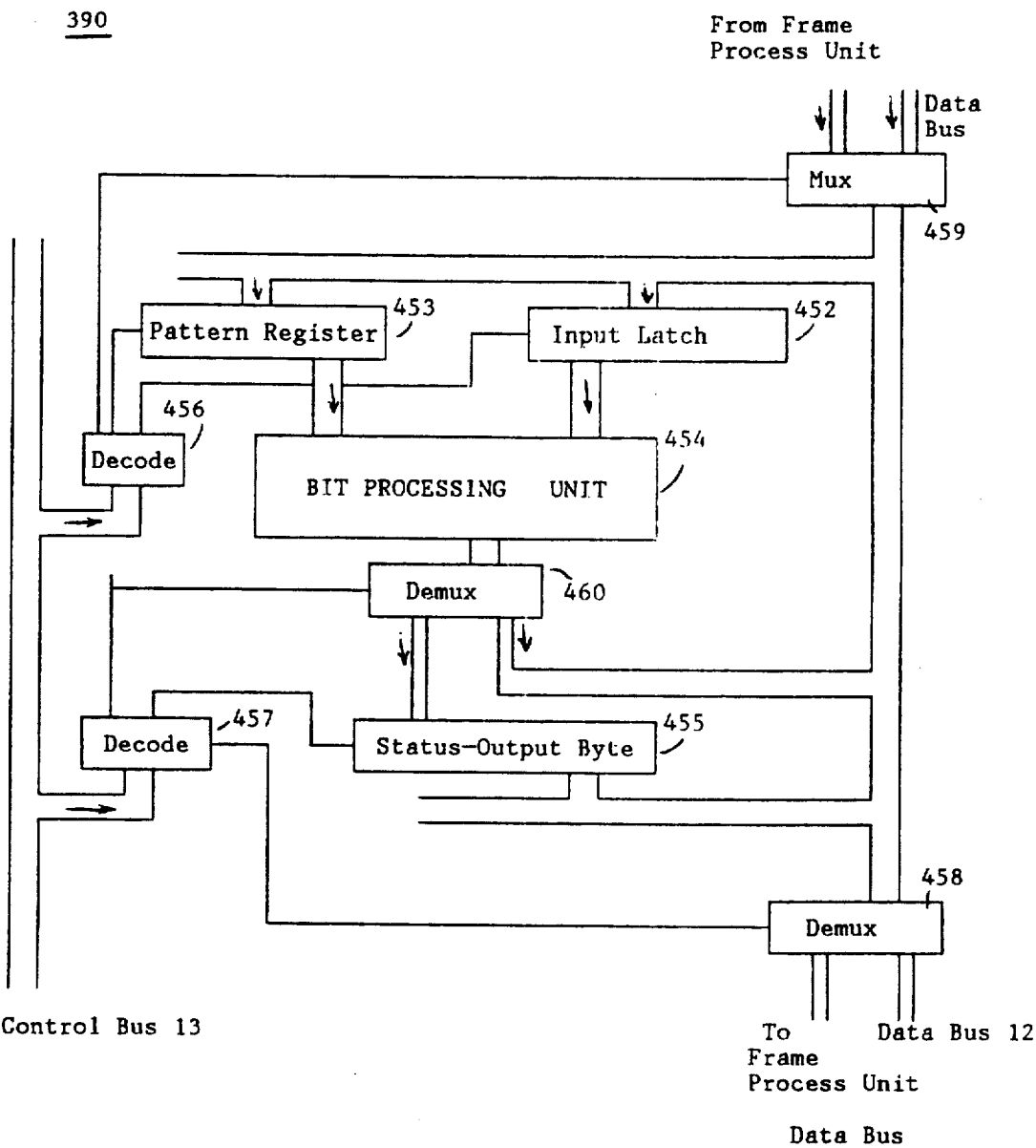
FIG. 21 illustrates a unit for bit insertion/deletion operations.

Multiplexers 435 in FIG. 20 and 459 in FIG. 21 are selected by decoders 432 and 456 respectively to enable path 354 to use processing units 430 and 454 respectively to compute the new Cyclic redundancy code (CRC) 368 and bit insertion/deletion word (BSW) 369. It should be noted that block move actions occur only when DRAM is accessible on a cycle steal basis (other units not requesting access), and when data translation is requested with the block move then the transfer waits for a machine cycle when the frame process unit is not being used by other instructions.

```
MODULE: BLOCK MOVE
MEMORY: SRCADDR[16];               */ register for source address
         DESTADDR[16];              */ register for destination
                                       address
         COUNT[16];                 */ register for buffer length
                                       for block move
         QPTR[16];                  */ block move queue pointer
         SQPTR[16];                 */ software queue pointer
         BMOSTAT[16];               */ block move status
         DATA[32];                  */ data register
         QUEUE<64>[16];             */ queue stack
         ACT[1]                     */ activity status bit
         CRCA[32]                   */ CRC accumulator
         BSWA[32]                   */ Bit insertion/deletion status/data
INPUTS: cyst                        */ cycle steal control line
        crc                         */ frame process for CRC enable
        bsw                         */ frame process for BSW enable
OUTPUTS: qdone                      */ qdone signal
BUSSES: DATADDR[16]:CDATA[16]       */ address and data
                                       busses for data ram
1. ->ACT[1]/1                       */ test activity - queue contents
2. SRCADDR[16]<- DCD(QPTR)*QUEUE    */ load block move
                                       information
   QPTR<-INC(QPTR)
3. DESTADDR[16]<- DCD(QPTR)*QUEUE
   QPTR<-INC(QPTR)
4. COUNT[16]<- DCD(QPTR)*QUEUE
   QPTR<-INC(QPTR)
5. BMOSTAT[16]<- DCD(QPTR)*QUEUE
   QPTR<-INC(QPTR)
6. ->cyst/6                         * scan for cycle steal signal
7. CDATA <- DCD(SRCADDR)*MEMORY     * perform data move
   DCD(DESTADDR)*MEMORY <- CDATA
   SRCADDR <INC(SRCADDR)
   DESTADDR <- INC(DESTADDR)
   COUNT <- DEC(COUNT)
7.1 ->crc/7.3                       * test if CRC in parallel
7.2 CRCA <- CRC(CDATA)              * perform CRC operation
7.3 ->bsw/8                         * test if BSW in parallel
7.4 BSWA <- BSW(CDATA)              * bit insert/delete
8. ->(V/COUNT)/6                    * is count zero
9. ->(V/(QPTR.XOR.SQPTR))/2         * is queue empty
10. qdone = 1 ->1
```

Frame Processing Unit

Figure 19:
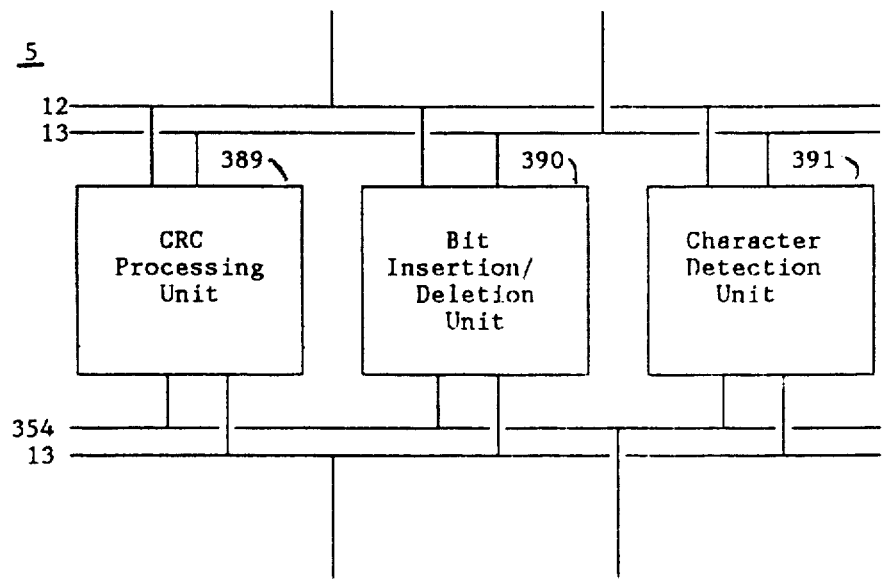
FIG. 19 illustrates a frame processing unit for the CPP.

FIG. 19 shows components of the frame process unit dedicated to performing operations on frame information and packets for overall error checking and data transparency. The cyclic redundancy code unit 389 performs error checking via cyclic redundancy code (CRC) computations. The bit insertion/deletion hardware unit 390 provides insertion and deletion of bits on invocation of desired data patterns for separating frame delimiters and control words from actual data. The branch on control character detect unit 391 provides an automatic branching mechanism on special control characters for speeding up decision functions.

The CRC (Cyclic Redundancy Check) Instruction Circuit

This circuit is described by FIG. 20. Information in register 428 is processed for CRC computation 430 using the polynomial register RR 429. The output is available in CRC accumulator 431. Register 429 is a 32 bit register programmable for any standard CRC-CCITT or CRC-16. It is important that the polynomial register and CRC accumulator be initialized before each new computation. The control bus provides proper flow of data. Registers 429 and 431 can be loaded by a register transfer operation using data bus 13. Decoders 432 and 433, responsive to the CRC instruction opcode on control bus 12 generate the control signals for gating the input latch 428 to CRC computation unit 430 and also to latch the new accumulated value to CRC accumulator 431. Decoder 432, responsive to a register transfer operation via data bus 13, generates the control signal to load the CRC polynomial register 429. Multiplexer 435 and demultiplexers 434, 436, serve to select the path of usage of the CRC computation unit 430, either for a regular instruction or as part of a data translation accompanying a block move operation. The computation logic 430 is non clocked and has been mentioned in prior art reference Beaven 78, in the IBM Technical Disclosure bulletin Vol. 21, No. 5, Oct. 1978, pages 2058-2061, Reference (2).

The BSW Instruction Circuit

This circuit is described by FIG. 21. Information in register 452 is processed for bit insertion/deletion 454 using pattern register RR 453. The output is available in the status—output byte 455. The pattern register is an eight bit register containing a sequence of bits on the occurrence of which the output may insert or delete a bit for transparency. It is important that the pattern register and the output status byte be initialized before any new computation. The control bus provides proper flow of data. The registers 453 and 455 can be loaded by a register transfer operation via data bus 13. Decoders 456 and 457, responsive to the BSW instruction opcode on control bus 12, generate control signals for gating input latch 452 to bit processing unit 454 and also to latch the new byte and status to status-output 455. Decoder 456, responsive to a register transfer operation via data bus 13, generates the control signal to load pattern register 453. Multiplexer 459 and demultiplexers 458, 460 are serve to select the path of usage of bit processing unit 454 either for a regular instruction or as part of a data translation for block move operation.

FIG. 22 shows details of bit processing unit 454 of FIG. 21. Data from input latch 452 and status word 455, also in FIG. 21, is selected by select units 480 (S) so that result data from each unit consists of six bits relatively shifted by one bit for all input lines. Compare units 481 (C) compare each six bit value from units 480 with input from pattern register 453 (FIG. 21), and outputs are fed to bit insert/delete logic 482. The table at the lower part of FIG. 22 shows the function of logic 482 whose output includes byte OB and status for register 455 (FIG. 21); the status consisting of the previous byte PB, the residue bits after insertion or deletion, the count of bits, and a flag E denoting existence or non-existence of residue value of 8.

The BCD Instruction Circuit

This circuit is described by FIG. 23. Information in register RR 556 is processed for character detection. An automatic branch is taken to the new branch address output 559. Decode load register 557 is used to initialize branch on character unit 558 for the various branch addresses. Decoder initialization is dependent on the protocol being used and the branch addresses needed for decision branching routines. The control bus provides proper flow of data. Decoders 560 and 561, responsive to the BCD instruction opcode on control bus 12, gate input latch 556 to branch on character unit 558 and latch the new branch address 559. Decoder 560 responsive to a register transfer operation via data bus 13 generates control signals to initialize the elements of 558.

Figure 24:
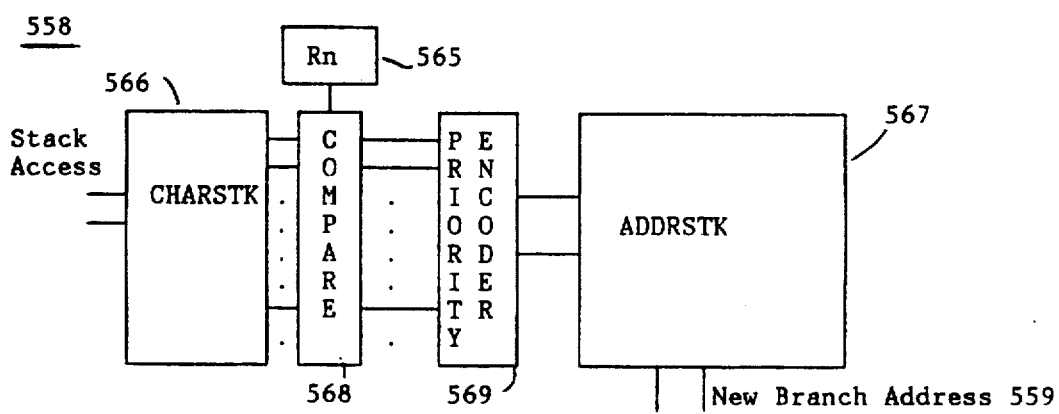
FIG. 24 shows details of the unit shown in FIG. 23.

Described below is an AHPL data notation description for logic of the control character detect operation. FIG. 24 describes hardware used for the operation. The character stack 566 and the branch address stack 567 are initialized with addresses for conversions with one to one correspondence. This allows compare circuit 568 in conjunction with priority encoder circuitry 569 to use the value in input register Rn 565 to select a corresponding branch address in branch address stack 262 which can be sent to the output register (Block 559 in FIG. 23). The stack access decode mechanism is as shown in FIG. 8 and as described in detail relative thereto in terms of the priority branch on bit detect function.

```
MODULE: BRANCH ON
CHARACTER DETECT
MEMORY: CHARSTK<8>(8)      */ character stack 8 bytes -566
ADDRSTK<8>(16)             */ branch address stack 8
                              words (16b) -567
BR(16)                     */ branch register -559
INPUTS: bcddecode          */ BCD instruction decode
                              line
Rn                         */ any register
OUTPUTS:BR(16)             */ branch register - 559
BUSSES: CMPBUS(8)          */ compare bus
1. BR <- BCD(Rn).
   BCD(Rn) = DCD(PRIORITY ENCODE (CMPBUS))
   * ADDRSTK
   */ PRIORITY ENCODE is standard priority encode
   CMPBUS(8) = (V(Rn.XOR.CHARSTK(1))) */ compare
   (V(Rn.XOR.CHARSTK(2))) */characters
   (V(Rn.XOR.CHARSTK(3)))
   (V(Rn.XOR.CHARSTK(4)))
   (V(Rn.XOR.CHARSTK(5)))
   (V(Rn.XOR.CHARSTK(6)))
   (V(Rn.XOR.CHARSTK(7)))
   (V(Rn.XOR.CHARSTK(8)))
```

We claim:

1. In a communication processor for efficient execution of data processes associated with layered communication protocols, said processor having discrete machine cycles of operation and cooperating with an external memory system containing programs of instructions and data related to said instructions, said data comprising header and frame information for said layered communication protocol processes and said instructions comprising at least instructions of first and second types, instructions of said first type pertaining to the processing of said header and frame information data, said instructions of said second type comprising instructions other than those of said first type, the improvement comprising:

means coupled to said external memory system for retrieving and decoding said instructions;

special purpose logic circuit means coupled to said retrieving and decoding means and said external memory system for performing processes designated by said instructions of said first type, said special purpose logic circuit means being adapted specifically for performing all operations required by each instruction of said first type in a single said machine cycle of operation of said processor; and general purpose arithmetic logic circuit means coupled to said retrieving means and said external memory system for cooperating therewith to execute processes designated by retrieved instructions of said second type, said general purpose logic circuit means operating under control of said retrieving means for performing functions designated by individual instructions of said second type processor;

said instructions of said first type and the related operations of said special purpose logic circuit means being characterized further in that execution of each such instruction would have required multiple said machine cycles if performed via said general purpose arithmetic logic circuit means.

2. A communication processor in accordance with claim 1 wherein said instructions contained in said external memory system include instructions of a third type associated with block data movement processes in said layered communication protocols, said processor being characterized in that:

said special purpose logic circuit means for executing said instructions of said first type comprises separate header and frame processing circuit units for respectively processing said header and frame information; and said processor further comprising:

memory access unit means coupled to said external memory system and said retrieval and decoding means for performing only data block movement processes designated by said instructions of said third type.

3. A processor in accordance with claim 2 wherein said header processing circuit unit comprises separate units for performing in single said machine cycles: priority branching operations, register reshape operations and address processing operations; said priority branching operations serving to test header bits denoting branch conditions in a predetermined order of priority ranking and to produce as end result an address of an instruction suited to the conditions found in the test; said register reshape operations being useful for manipulating header data for reordering or masking bit sequences; and said address processing operations serving to translate addresses in information frames to corresponding route and/or memory addresses for further transfer of information.

4. A processor in accordance with claim 2 wherein said frame processing circuit unit comprises separate circuit units for performing cyclic redundancy check computations, bit insertion/deletion operations and character detection operations.

5. A processor in accordance with claim 3 wherein said priority branching unit comprises:
- an input register for storing a predetermined number n of data bits carried in said header segments; said bits individually when active denoting conditions requiring special branching action;
- a stack of n address registers for storing addresses associated with individual bit positions in said input register;
- priority encode circuitry coupled to said register and stack for selecting an address from said stack associated with a highest priority ranked bit in said input register having a value denoting an active condition requiring branching action; and
- means for presenting said selected address to said memory means for designating the next instruction to be fetched therefrom.

6. A processor in accordance with claim 3 wherein said register reshape circuit unit comprises:
- an input register for storing a predetermined number n of data bits carried in said header segments; said bits having predetermined positional ordering and carrying variable header information;
- a reshape code register for defining options for swapping, masking, and shifting relative to data in said input register;
- means for multiplexing and decoding the said input register and said reshape code register to extract information logically related to the contents of said input register in accordance with functions defined in said reshape code register;
- an output register; and
- means for transferring the information extracted by said multiplexing and decoding means into said output register.

7. A processor in accordance with claim 3 wherein said unit for performing address processing operations comprises:
- an input register for storing a predetermined number n of data bits carried in said header segments; said bits carrying address information for information data frames;
- a channel identification register for defining logical channels to which values in said input register belong;
- a stack of n addresses for associative lookup of data relating to the data in said input register to generate route addresses
- a comparator and priority encoder to select the appropriate route address and store it in the destination address register.

8. A processor in accordance with claim 4 wherein said unit for performing cyclic redundancy check (CRC) operations comprises:
- an input register containing data on which CRC computation is to be performed;
- a polynomial code register which contains a polynomial used for the CRC computation;
- a CRC computation unit for performing a CRC computation on data in said input register in a single said machine cycle, using the polynomial stored in said polynomial register; and
- a CRC accumulator register for receiving results of said CRC computation.

9. A processor in accordance with claim 4 wherein said unit for performing bit insertion/deletion operations comprises:
- an input register for data on which bit insertion or deletion operations are to be performed;
- a pattern register for storing a pattern used for determining where to insert or delete data;
- a bit insertion/deletion unit for operating in a single said machine cycle to insert bits into or delete bits from data received from said input register, at positions determined by said pattern register, said unit performing its operation in a single said machine cycle; and
- an output register for storing result data produced by said bit insertion/deletion unit.

10. A processor in accordance with claim 4 wherein said unit for performing character detection operations comprises:
- an input register for storing a byte of data carried in said header segments;
- a stack of n branch addresses; and
- a comparator/priority encoder to select one of said branch addresses from said stack in association with the data in said input register.

11. A communication processor in accordance with claim 2 wherein said memory access unit means comprises:
- block move circuit means including means to transfer blocks of data between source and destination addresses in said memory system with logical translation of said data; each said source address designating a first location in said memory system defining the beginning of a space in said system in which a block of source data resides; each said destination address designating a first location in said memory system defining the begining of a space in said system for storing a block of destination data;
- means including a counting register for storing buffer length information; said buffer length information denoting a number of data bytes to be transferred from said memory system beginning at a said source address;
- means including a register stack to queue block move requests designated by individual instructions of said third type in said stack; said means to queue having queueing capacity to store a plurality of said block move requests on a first come first served basis using queue pointers to indicate stages of processing of said queued requests; said queue pointers comprising both hardware based and software based pointer elements; said hardware based elements denoting location of a request currently being processed by said block move circuit; said software based elements denoting location of a last request submitted to the queue for block move processing;
- said means to transfer blocks of data selectively designating bit insertion and deletion operations or cyclic redundancy check calculation operations in conjunction with individual block move operations;
- said means to transfer blocks of data further comprising a block move control unit for executing said queue requests in predetermined order.

12. A communication processor in accordance with claim 3 wherein said header processing circuit unit contains a priority branch unit for performing said priority branching operations, said priority branch unit comprising:
- input latches for storing n condition bits defining active and inactive branching conditions;
- means responsive to a BBD (Branch on Bit Detect) instruction for loading said latches with one of k sets of n condition defining bits;
- an address register stack comprising k sets of n addresses representing destinations in said external memory system determinable by bits in respective said sets of condition bits; and
- means responsive to each said BBD instruction for selecting a set of addresses from said stack associated with the set of condition bits currently stored in said latches and for selecting from the selected set of addresses an address associated with a bit stored in said latches; said address associated with said stored bit designating location of the next instruction to be fetched from said external memory system by said retrieval and decoding means for execution by said processor and said associated stored bit denoting an active condition having highest priority for attention.

13. A processor in accordance with claim 12 wherein said means responsive to said BBD instruction for selecting said set of addresses and said address comprises:
- a stack of k (k>1) sets of n (n>1) selection control registers, each set of registers associated with a respective one of k sets of condition bits loadable from said external memory system into said input latches;
- a priority encoder circuit coupled to said selection control register stack and said input latches, said encoder circuit responding to each said BBD instruction to select one of the k sets of selection control registers associated with bits currently latched in said input latches and to further select one control register in the selected set in association with a highest priority active bit in said latches; and
- means responsive to contents of the selected selection control register to select an associated one of the addresses in an associated one of said k sets of addresses in said address stack.

14. A method of conducting data processes pertaining to communications in a communication network—said network comprising data processing nodes at each of which data processes pertaining to a plural-layered communication protocol may be performed, said processes requiring processing of header and frame information accompanying message data units in each layer of said layered communication protocol, said header and frame information accompanying and delineating message data units being communicated over said network, said header information comprising discrete first, second and third header information units, said first header information unit comprising a set of bits representing status of a respective set of communication conditions which when active require attention in a predetermined order of priority, said second header information unit comprising address information for determining routing of the accompanying message data unit, and said third header information unit comprising a set of bits representing message variable parameters associated with respective message data units, the bits in said third unit requiring rearrangement for accurate extraction of the associated message unit information, said frame information to be processed in each layer comprising cyclic redundancy check (CRC) characters requiring cyclic redundancy check computation processing and control characters uniquely demarking frame positions, said control characters necessitating that accompanying message data units be subjected to bit insertion and deletion processes in order to ensure unique recognizability of the control characters at receiving nodes of said network whereby message data characters do not conflict with said control characters—, said method comprising:
- processing information in multiple said protocol layers at a single processing center at each node of said network in a parallel processing mode; each said center having a predetermined machine cycle period of operation; each said center including a general purpose processing section and a plurality of special purpose processing sections, said sections being capable of operating in parallel during any said machine cycle period; each special purpose section being designed for performing a complex operation in a single said machine cycle which operation if performed in said general purpose section would require multiple said machine cycles for completion; and
- directing performance of complex processing operations relative to each of said header units as well as said CRC computation and said insertion and deletion processes into selected ones of said special purpose sections, whereby individual header unit processing operations, CRC computations and bit insertion and deletion operations are each performed in a single said machine cycle period.

15. The method of claim 14 wherein said concentrated handling of said first set of header unit information includes:
- within one of said machine cycle periods, performing a priority encoding operation on the bits of said first set to produce a priority code indication associated with a highest priority one of the bits representing an active condition requiring special action; and
- within the same cycle period and as a function of said associated priority code indication locating an associated first instruction of a program routine for effecting said special action.

16. The method of claim 14 wherein said concentrated handling of said second set of header unit information includes:
- within a single said machine cycle period, extracting an address associated with said second header unit by performing an associative table lookup translation.

17. The method of claim 14 wherein said concentrated handling of said third set of header unit information includes:
- preloading said information of said third set into a register; and
- within a single said machine cycle period performing a selected one of a plurality of register reshaping functions on said information to present said information in a required rearranged format.

18. The method of claim 14 wherein said concentrated handling of said frame unit information includes:
- performing each said CRC operation in a single said machine cycle period.

* * * * *